(12) United States Patent
Field

(10) Patent No.: US 12,420,351 B1
(45) Date of Patent: Sep. 23, 2025

(54) PORTABLE PURGE CHAMBER FOR CONTROLLED ATMOSPHERE WELDING OF READILY CONTAMINATED METALS LIKE TITANIUM OR ZIRCONIUM

(71) Applicant: Travis Field, Cypress, TX (US)

(72) Inventor: Travis Field, Cypress, TX (US)

( * ) Notice: Subject to any disclaimer, the term of this patent is extended or adjusted under 35 U.S.C. 154(b) by 0 days.

(21) Appl. No.: 19/065,178

(22) Filed: Feb. 27, 2025

Related U.S. Application Data

(62) Division of application No. 29/991,190, filed on Feb. 27, 2025.

(51) Int. Cl.
  *B23K 9/32* (2006.01)
  *B23K 9/16* (2006.01)
  *B23K 101/06* (2006.01)

(52) U.S. Cl.
  CPC .............. *B23K 9/325* (2013.01); *B23K 9/164* (2013.01); *B23K 2101/06* (2018.08)

(58) Field of Classification Search
  CPC ........ B23K 9/164; B23K 9/325; B23K 9/326; B23K 2101/06
  See application file for complete search history.

(56) References Cited

U.S. PATENT DOCUMENTS

| | | |
|---|---|---|
| 857,247 A | 6/1907 | Menne |
| 904,482 A | 11/1908 | Howell |
| 1,746,081 A | 2/1930 | Hobart |
| 1,749,765 A | 3/1930 | Hendrickson |
| 2,053,417 A | 9/1936 | Brace |
| 2,459,812 A | 1/1949 | Griffiths |
| 2,472,020 A | 5/1949 | Klain et al. |
| 2,496,347 A | 2/1950 | Herbst |
| 2,497,629 A | 2/1950 | Rieppel |
| 2,576,793 A | 11/1951 | Jordan |
| 2,590,084 A | 3/1952 | Bernard |
| 2,602,871 A | 7/1952 | Noland et al. |
| 2,702,846 A | 2/1955 | Breymeier |
| 2,758,186 A | 8/1956 | Ludwig |
| 2,866,074 A | 12/1958 | Ronay |
| 2,902,587 A | 9/1959 | Bernard |
| 2,918,563 A | 12/1959 | Ternisien et al. |
| 3,047,714 A | 7/1962 | Wepfer |

(Continued)

FOREIGN PATENT DOCUMENTS

| | | |
|---|---|---|
| AT | 167879 | 3/1951 |
| DE | 1691149 | 10/1954 |

(Continued)

OTHER PUBLICATIONS

Argweld(R) Weld Trailing Shield, https://huntingdonfusion.com/products/argweld-accessories/argweld-weld-trailing-shields/ (last accessed Feb. 27, 2025).

*Primary Examiner* — Brian W Jennison

(74) *Attorney, Agent, or Firm* — The Buche Law Firm, P.C.; Bryce A. Johnson; John K. Buche

(57) ABSTRACT

Disclosed is a modular purge chamber system designed to create precision-controlled inert or reactive gas environments for welding titanium, zirconium, aluminum, and other oxidation-prone metals. The system preferably addresses persistent challenges in maintaining atmospheric isolation during welding operations while improving accessibility and gas efficiency compared to traditional trailing shields.

4 Claims, 23 Drawing Sheets

(56) References Cited

U.S. PATENT DOCUMENTS

| | | | |
|---|---|---|---|
| 3,450,857 A | | 6/1969 | Webb |
| 3,875,364 A | | 4/1975 | Boyett |
| 4,023,831 A | | 5/1977 | Thompson |
| 4,528,436 A | * | 7/1985 | Stol ............... B23K 9/0282 219/61 |
| 4,562,334 A | | 12/1985 | Brandt |
| 4,579,318 A | | 4/1986 | Keedy |
| 5,081,334 A | | 1/1992 | Copher et al. |
| 5,152,453 A | | 10/1992 | Leturno |
| 6,325,277 B1 | * | 12/2001 | Collie ............ B23K 9/0286 228/44.3 |
| 6,637,640 B1 | * | 10/2003 | Sennett ........... B23K 9/325 228/17 |
| 8,272,557 B1 | | 9/2012 | Fikes et al. |
| 10,088,060 B2 | | 10/2018 | Sundrla |
| 2008/0076341 A1 | | 3/2008 | Wardlaw |
| 2009/0107970 A1 | | 4/2009 | Norrish et al. |
| 2010/0276396 A1 | | 11/2010 | Cooper et al. |

FOREIGN PATENT DOCUMENTS

| | | |
|---|---|---|
| DE | 1092581 | 11/1960 |
| WO | 2024052904 A1 | 3/2024 |

\* cited by examiner

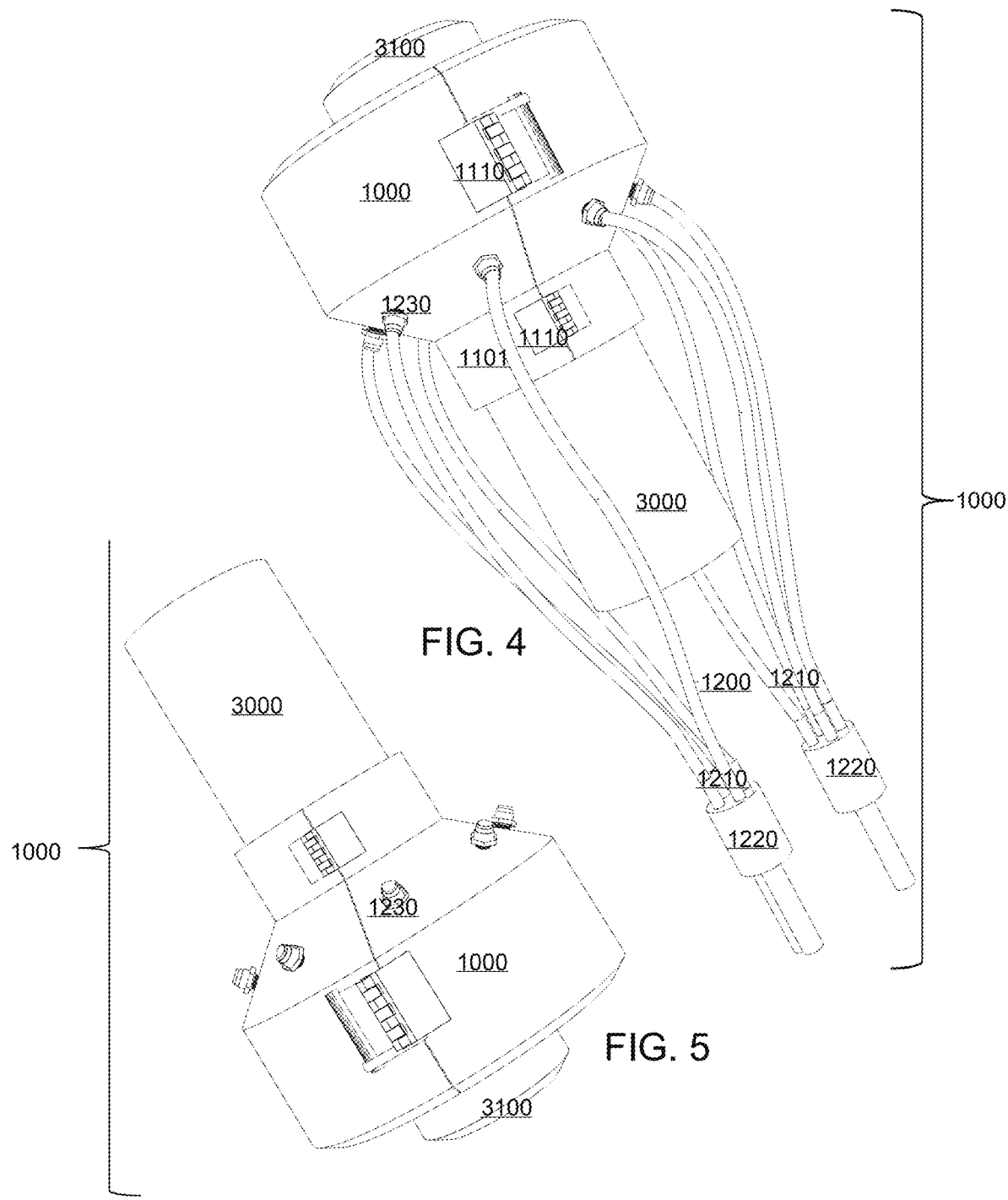

PORTABLE PURGE CHAMBER FOR CONTROLLED ATMOSPHERE WELDING OF READILY CONTAMINATED METALS LIKE TITANIUM OR ZIRCONIUM

CROSS-REFERENCE TO RELATED APPLICATIONS

This application is a divisional of U.S. Des. patent application Ser. No. 29/991,190 (filed Feb. 27, 2025). See Application Data Sheet (ADS).

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

An experimental prototype of the disclosed purge chamber system was tested by the inventor, Travis Field, at the Kentucky Welding Institute on Feb. 10, 2025. During this evaluation, welding trainees and institute staff observed the system's structural configuration, including its concentric reducers, argon distribution hoses, stainless steel wool diffusers, and recessed latch mechanism. The demonstration involved welding titanium and zirconium piping under controlled inert conditions, achieving oxygen levels below 25 ppm and oxidation-free welds in 83% of novice attempts.

BACKGROUND OF THE INVENTION

Field of Invention

This specification describes subject matter in the field of welding technology, specifically to systems and methods for shielding reactive metals such as titanium, zirconium, and aluminum during welding processes. More particularly, it pertains to portable, modular gas purge systems designed to isolate weld joints from atmospheric contamination while optimizing gas efficiency and operational accessibility.

Listing of the Prior Art

The following references might be to be related to the disclosed subject matter:

| Doc. No. | Pub. Date | Inventor |
| --- | --- | --- |
| U.S. Pat No. 857,247 | 1907 Jun. 18 | Menne |
| U.S. Pat No. 904,482 | 1908 Nov. 17 | Howell |
| U.S. Pat No. 1,746,081 | 1930 Feb. 4 | Hobart |
| U.S. Pat No. 1,749,765 | 1930 Mar. 11 | Hendrickson |
| U.S. Pat No. 2,053,417 | 1936 Sep. 8 | Brace |
| U.S. Pat No. 2,459,812 | 1949 Jan. 25 | Griffiths |
| U.S. Pat No. 2,472,020 | 1949 May 31 | Klain et al. |
| U.S. Pat No. 2,496,347 | 1950 Feb. 7 | Herbst |
| U.S. Pat No. 2,497,629 | 1950 Feb. 14 | Rieppel |
| AT167879 | 1951 Mar. 10 | Kreglewski |
| U.S. Pat No. 2,576,793 | 1951 Nov. 27 | Jordan |
| U.S. Pat No. 2,590,084 | 1952 Mar. 25 | Bernard |
| U.S. Pat No. 2,602,871 | 1952 Jul. 8 | Noland et al. |
| DE1691149 | 1954 Oct. 25 | von Rohren |
| U.S. Pat No. 2,702,846 | 1955 Feb. 22 | Breymeier |
| U.S. Pat No. 2,758,186 | 1956 Aug. 7 | Ludwig |
| U.S. Pat No. 2,866,074 | 1958 Dec. 23 | Ronay |
| U.S. Pat No. 2,902,587 | 1959 Sep. 1 | Bernard |
| DE1067949 | 1959 Oct. 29 | Ternisien et |
| U.S. Pat No. 2,918,563 | 1959 Dec. 22 | Ternisien et |
| DE1092581 | 1960 Nov. 10 | Roessner |
| U.S. Pat No. 3,047,714 | 1962 Jul. 31 | Wepfer |
| U.S. Pat No. 3,450,857 | 1969 Jun. 17 | Webb |
| U.S. Pat No. 3,875,364 | 1975 Apr. 1 | Boyett |
| U.S. Pat No. 4,023,831 | 1977 May 17 | Thompson |
| U.S. Pat No. 4,528,436 | 1985 Jul. 9 | Stol |
| U.S. Pat No. 4,562,334 | 1985 Dec. 31 | Brandt |
| U.S. Pat No. 4,579,318 | 1986 Apr. 1 | Keedy |
| U.S. Pat No. 5,081,334 | 1992 Jan. 14 | Copher et al. |
| U.S. Pat No. 5,152,453 | 1992 Oct. 6 | Leturno |
| U.S. Pat No. 8,272,557 | 2012 Sep. 25 | Fikes et al. |
| U.S. Pat No. 10,088,060 | 2018 Oct. 2 | Sundrla |
| US20080076341 | 2008 Mar. 27 | Wardlaw |
| US20100276396A1 | 2010 Nov. 4 | Cooper et al. |
| WO2024052904A1 | 2024 Mar. 14 | Tevet |
| US20090107970A1 | 2009 Apr. 30 | Norrish et al. |

See the Information Disclosure Statements (IDS) of record.

Background of the Invention

The field of welding reactive metals such as titanium and zirconium has long faced a critical challenge: maintaining an oxygen-free environment during the welding process. These metals, valued for their exceptional strength-to-weight ratios and corrosion resistance, rapidly form brittle oxides and nitrides when exposed to atmospheric gases at the elevated temperatures inherent to welding. For instance, commercially pure titanium typically comprises at least 99% titanium, with strict impurity limits that are easily exceeded during conventional welding processes. Key impurity thresholds include iron (≤0.30%), carbon (≤0.08%), nitrogen (≤0.03%), oxygen (≤0.25%), and hydrogen (≤0.015%), with total other elements capped at 0.40%. Even trace oxygen levels exceeding 25 parts per million (ppm) during welding can degrade weld integrity, leading to embrittlement, discoloration, and reduced fatigue life-compromising the metal's structural and chemical properties.

Traditional shielding methods, such as trailing shields or inert gas curtains, have proven insufficient due to their reliance on operator skill to maintain dynamic gas coverage, geometric inflexibility, and excessive gas waste. Partial shielding from trailing systems often allows atmospheric infiltration through minor gaps, leading to oxygen, nitrogen, or hydrogen contamination—particularly detrimental in aerospace, nuclear, and medical applications where weld purity is non-negotiable. Complex joint geometries exacerbate these issues, as turbulent gas flow in conventional systems wastes inert gas (40-60 cubic feet per hour, CFH) while failing to ensure consistent coverage.

Prior art systems, such as Brandt's stationary gas shielding apparatus (U.S. Pat. No. 4,562,334), utilize screenwalled chambers to direct inert gas over weld areas. While effective for fixed applications, Brandt's design lacks adaptability to variable pipe diameters and induces turbulence at high flow rates, leaving weld zones vulnerable during torch repositioning. Stol's dual-chamber system (U.S. Pat. No. 4,528,436), though innovative for nuclear piping, requires precise alignment with rotating workpieces and offers no modularity for field repairs. Widely adopted trailing shields, such as Huntingdon Fusion's Argweld® models, demand constant manual pressure to maintain inert coverage—a skill-intensive process prone to failure on thin-walled or geometrically complex joints.

These conventional methods share critical deficiencies. Dynamic trailing shields expose heat-affected zones (HAZ) to contamination during cooling phases, while static systems consume excessive inert gas through turbulent flow. Furthermore, existing solutions lack compatibility with hybrid gas workflows, such as integrating reactive gases like carbon tetrachloride ($CCl_4$) for in-situ oxide removal as taught by Jordan's foundational work (U.S. Pat. No. 2,576,793). The industry's reliance on rigid, operator-dependent systems has resulted in inconsistent weld quality, high rework costs, and limited accessibility for novice welders.

The present invention addresses these gaps through a portable, modular purge chamber that encapsulates weld joints in a fully inert atmosphere. By replacing partial shielding with static encapsulation and integrating turbulence-reducing diffusers, the system achieves uniform argon coverage at 25-35 feet per hour (CFH)—less than half the consumption of trailing shields. Its split-shell design, featuring concentric reducers and silicone seals, adapts to ±10% pipe diameter variance, enabling field deployment without custom machining. Crucially, the chamber supports hybrid inert/reactive gas workflows, bridging mid-20th-century metallurgical principles with modern manufacturing demands.

In essence, prior art systems fail to reconcile portability, gas efficiency, and operator accessibility. The invention resolves this by democratizing skill requirements and ensuring contamination-free welds across industries, offering a paradigm shift in reactive metal welding through full encapsulation, optimized gas dynamics, and adaptive sealing technologies.

SUMMARY OF THE INVENTION

This specification introduces a modular purge chamber system designed to create precision-controlled inert or reactive gas environments for welding titanium, zirconium, aluminum, and other oxidation-prone metals. The system preferably addresses persistent challenges in maintaining atmospheric isolation during welding operations while improving accessibility and gas efficiency compared to traditional trailing shields. The purge chamber further solves the problem of maintaining a stable, oxygen-free environment when welding reactive metals such as titanium and zirconium where, without proper purging, these metals are highly susceptible to contamination from atmospheric gases like oxygen, nitrogen, and hydrogen. which can cause weld discoloration, oxidation, embrittlement, and reduced mechanical properties.

In one embodiment, the purge chamber system comprises split-shell concentric reducers constructed from heat-resistant polymers or PVC, which clamp around weld joints via a recessed latch system to form a sealed enclosure. A gas distribution network, employing eight ¼" hoses, delivers argon through stainless steel wool and 200-mesh diffusers to achieve laminar flow at 25-35 cubic feet per hour (CFH), minimizing turbulence and oxygen levels below 25 parts per million (ppm). Adaptive sealing mechanisms—including high-temperature silicone padding and heat-resistant tape—ensure airtight isolation of the weld zone while permitting quadrant-based access for welding. Transparent viewing windows, optionally supplemented by internal LED lighting, enable real-time inspection without disrupting the inert environment. For LED lighting, the lights may be incorporated into the body of the concentric reducer, e.g., around the rim on the inside of the hood and an external power source, e.g., battery power source.

Operators secure the chamber around pre-cleaned joints, initiate gas purging through a ¾" inlet, and maintain shielding during welding and post-cooling phases to prevent delayed contamination. This static encapsulation contrasts with traditional trailing shields, which rely on dynamic coverage and operator skill to maintain gas flow. The system's dual-mode functionality supports inert gases (Ar/He) and integrates adjustable vent holes (0.5-1.5 psi) to regulate pressure, achieving 95% gas utilization efficiency versus 60-70% in open systems.

Comparative testing at the Kentucky Welding Institute demonstrated an 83% success rate for oxidation-free titanium welds by novices using the purge chamber, versus 22% with conventional trailing shields. Key advantages include full atmospheric isolation (vs. partial coverage in prior art), reduced gas consumption (25-35 CFH vs. 40-60 CFH), and a weld defect rate below 3% for thin-walled pipes. Applications extend to zirconium nuclear components (preventing hydride embrittlement), aluminum aerospace structures (eliminating $Al_2O_3$ formation), and additive manufacturing chambers for oxidation-sensitive alloys.

By combining modular encapsulation, hybrid gas compatibility, and turbulence-reducing diffusers, the invention democratizes welding proficiency while ensuring contamination-free results across high-value industries.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 4 is a side perspective view of the a split shell (1000) of a purge chamber (2000) installed on a workpiece (3000);

FIG. 5 is a side perspective view of the an alternative configuration of a split shell (1000) of a purge chamber (2000) installed on a workpiece (3000);

In the figures, the following components of the preferred embodiment are shown in connection with the corresponding reference numeral identified below:

2000- Purge Chamber
  1000- concentric reducers
    1100- split shell
      1101- receptacle
      1102- hood
      1103- guide-rim or lip
      1110- latch system
      1120- heat shield and/or gasket of high-heat silicone
      1130- stainless steel wool diffuser
      1140- fine stainless steel woven mesh diffuser
      1150- stainless steel perforated sheet diffuser
    1200- Gas Distribution Network
      1210- hoses or tubing
      1220- four-to-one hose or tubing adapter
      1230- quick connect adapter (e.g., SharkBite ® male adapter)
    1300- heat-resistant tape
      1310 - window
3000-workpiece
    3100- weld joint or point It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

This is a specification of a modular purge chamber system designed to create precision-controlled inert or reactive gas environments for welding oxidation-prone workpieces. The disclosed purge chamber system preferably maintains atmospheric isolation of the weld point of a workpiece during welding operations. The system includes a gas distribution network aimed at improving accessibility and gas efficiency compared to traditional trailing shields. The more specific details of the disclosed purge chamber system are disclosed with reference to the FIGURES.

Figures 1, 2:
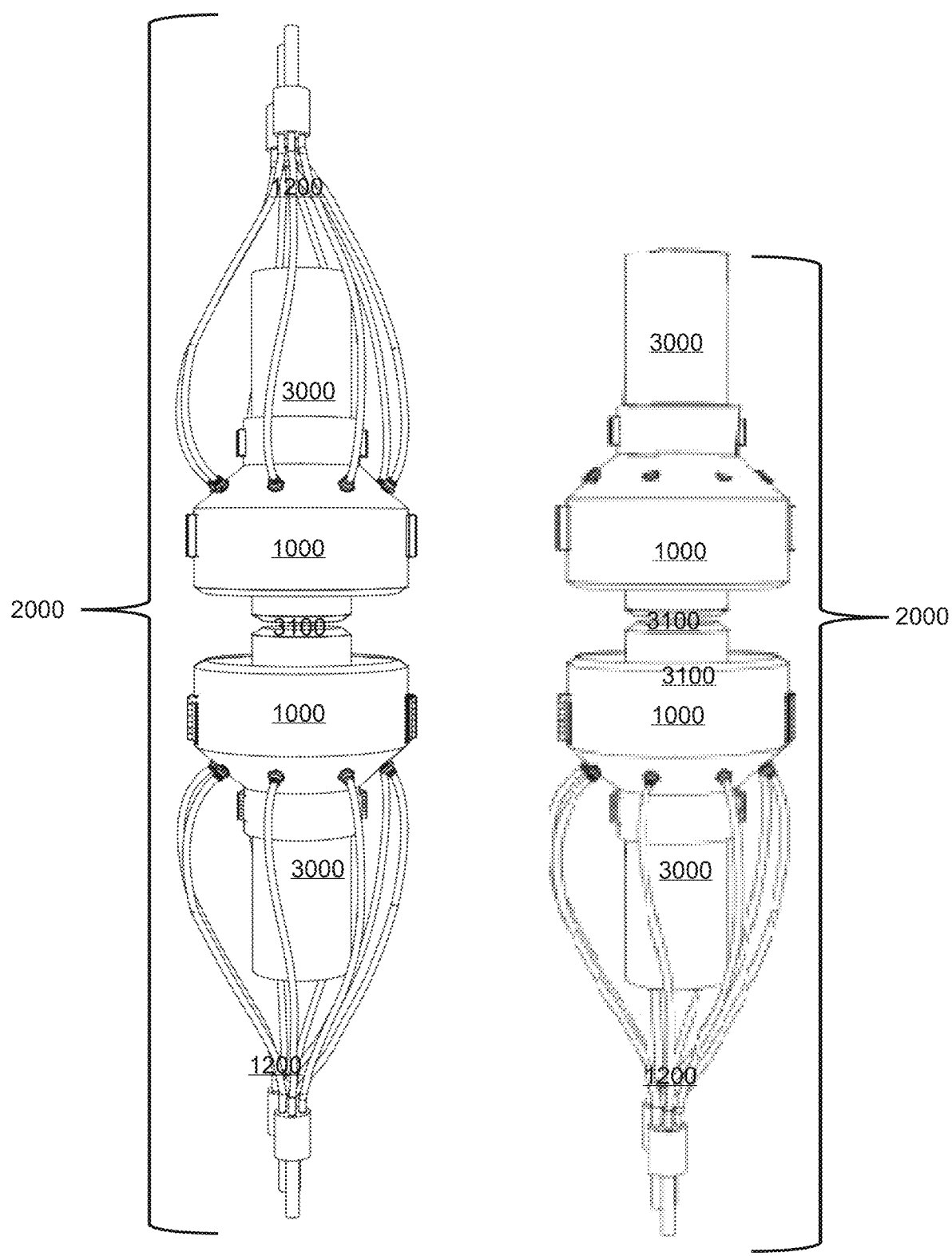
FIG. 1 is a front perspective view of a purge chamber (2000) installed on a workpiece (3000)
FIG. 2 is a front perspective view of another configuration of the purge chamber (2000) installed on a workpiece (3000)
Figure 3:
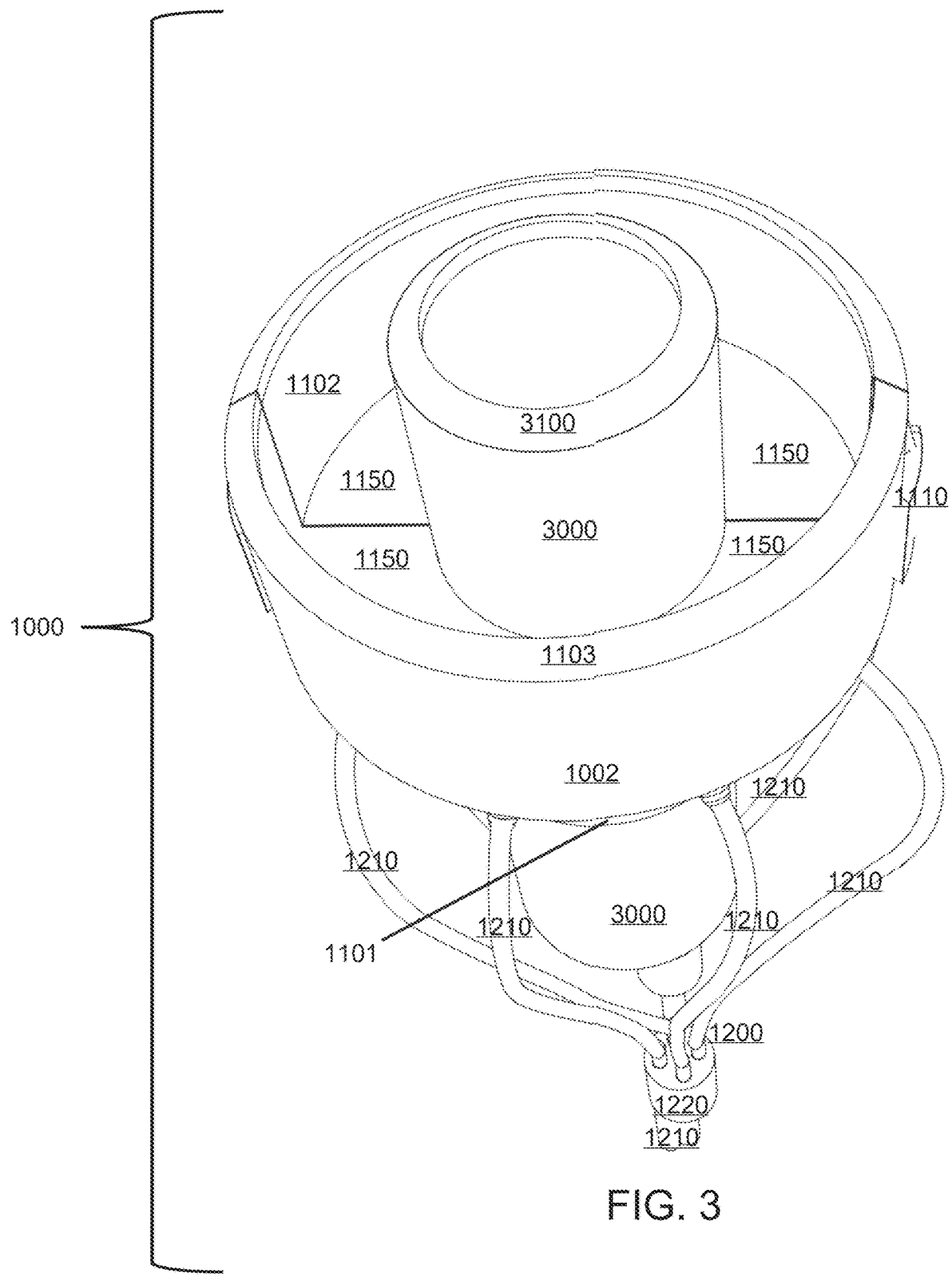
FIG. 3 is top perspective view of the a split shell (1000) of a purge chamber (2000) installed on a workpiece (3000)
Figure 6:
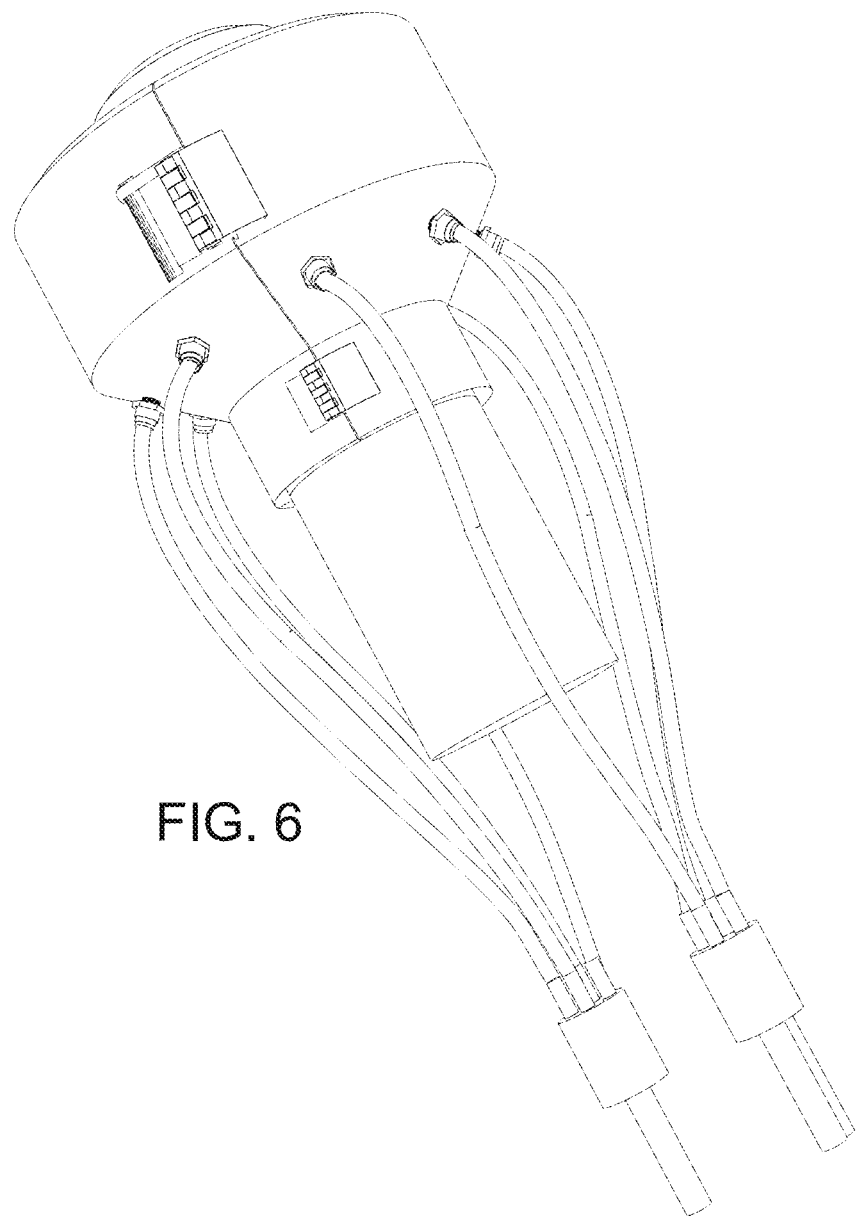
FIG. 6 is another side perspective view of the split shell (1000) of a purge chamber (2000) installed on a workpiece (3000)
Figure 7:
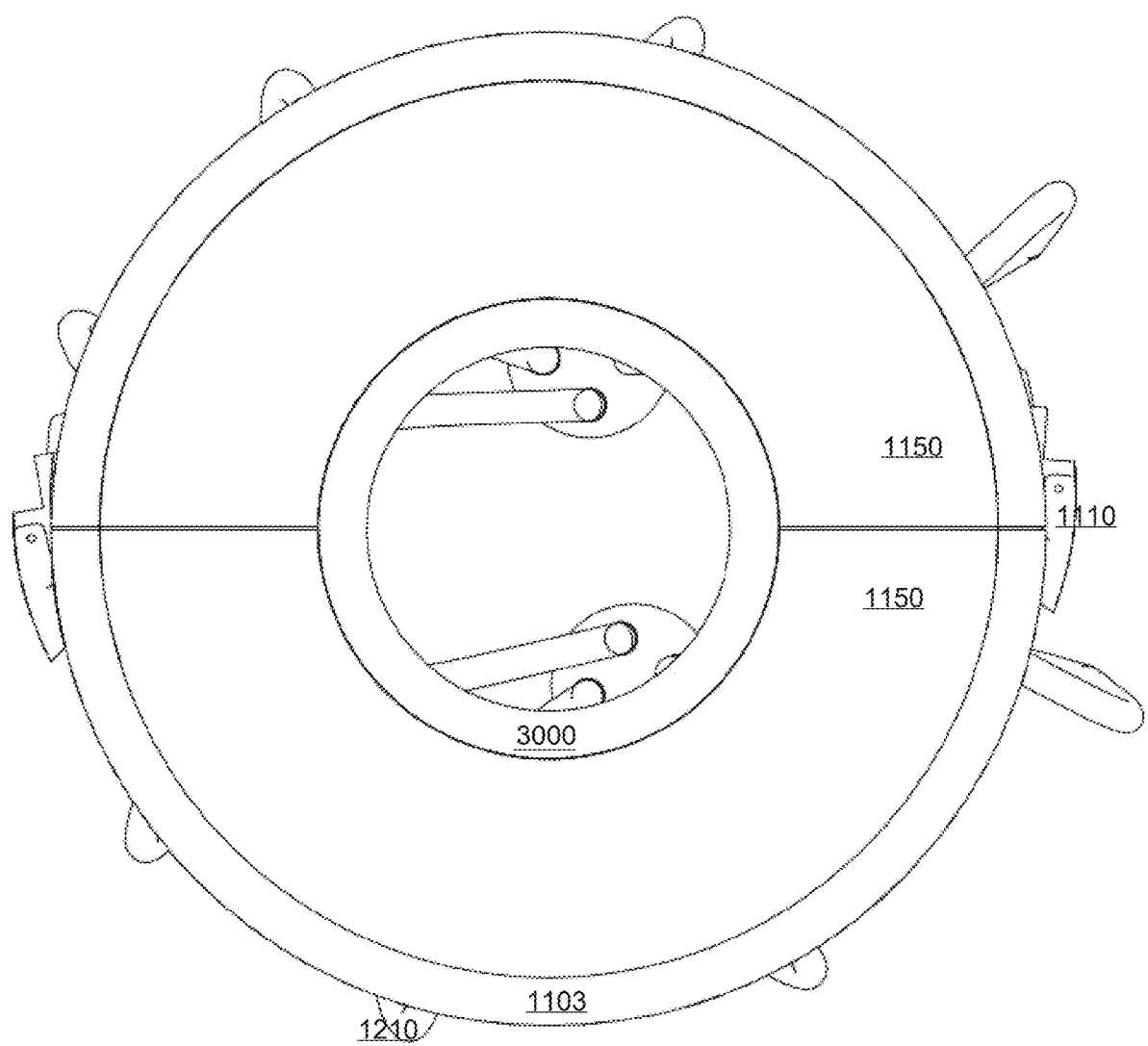
FIG. 7 is top view of the split shell (1000) of a purge chamber (2000) installed on a workpiece (3000)
Figure 8:
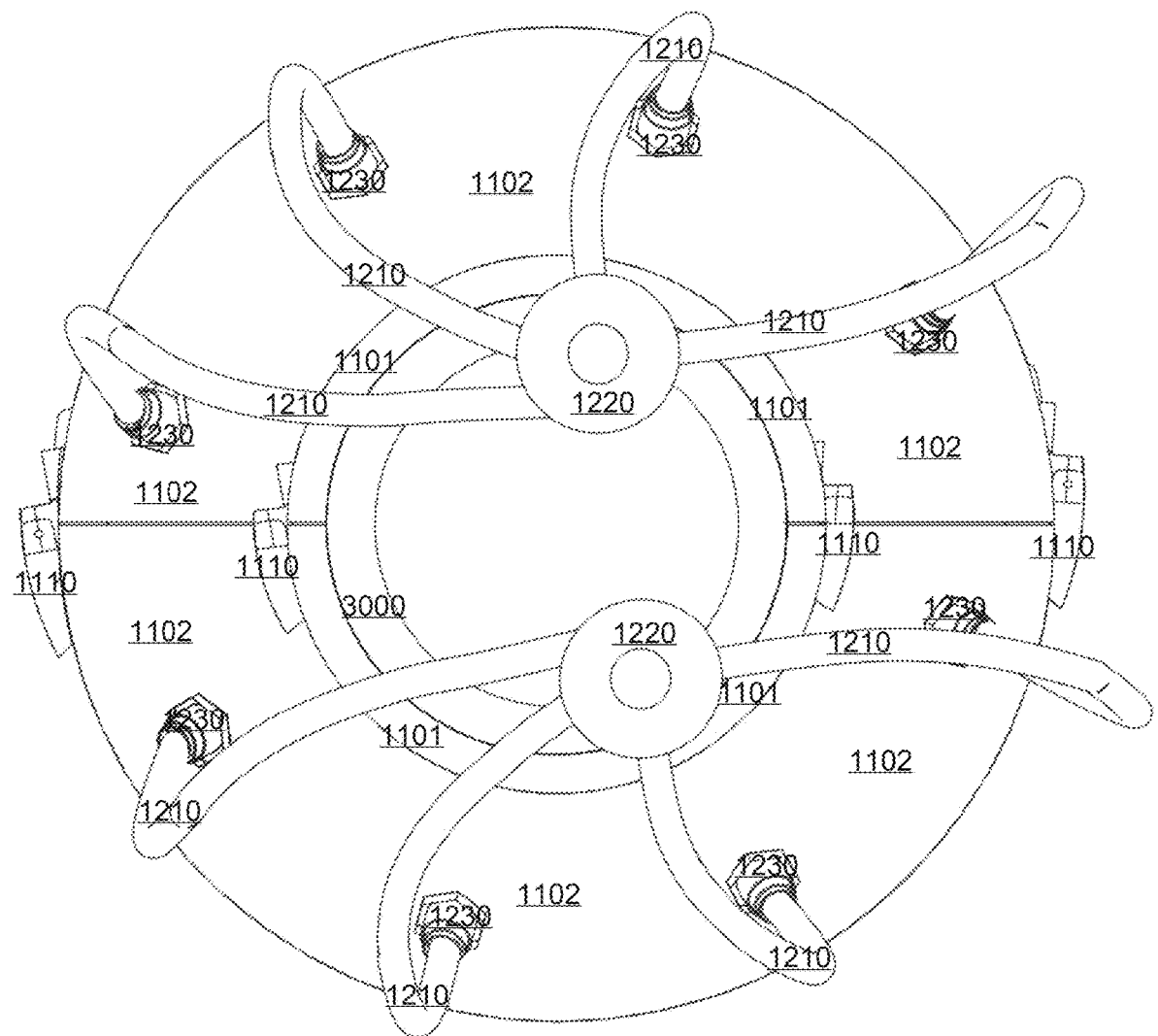
FIG. 8 is a bottom view of the split shell (1000) of a purge chamber (2000) installed on a workpiece (3000)
Figure 9:
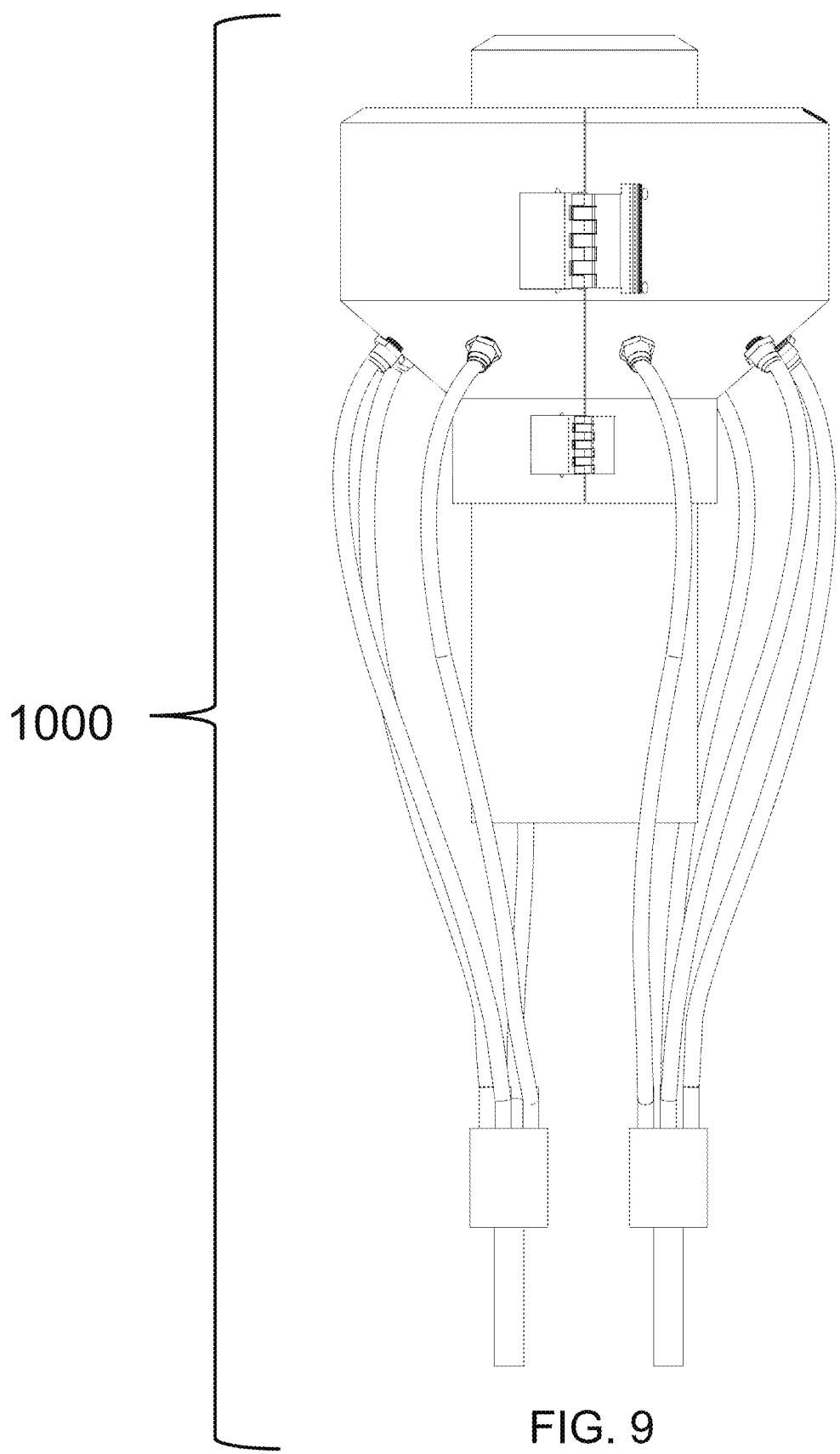
FIG. 9 is a side view of the split shell (1000) of a purge chamber (2000) installed on a workpiece (3000)
Figure 10:
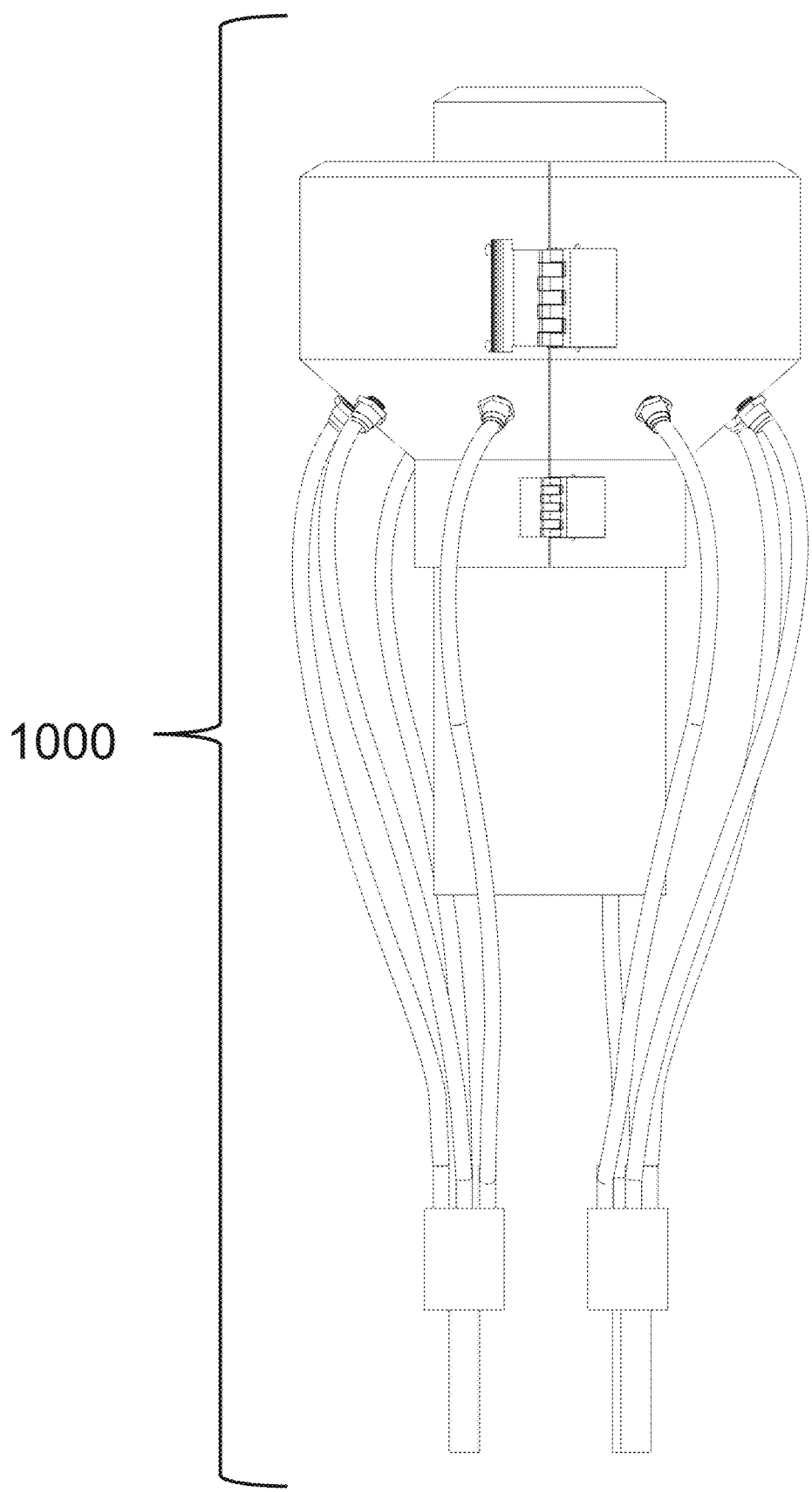
FIG. 10 is an opposite side view of the split shell (1000) of a purge chamber (2000) installed on a workpiece (3000)
Figure 11:
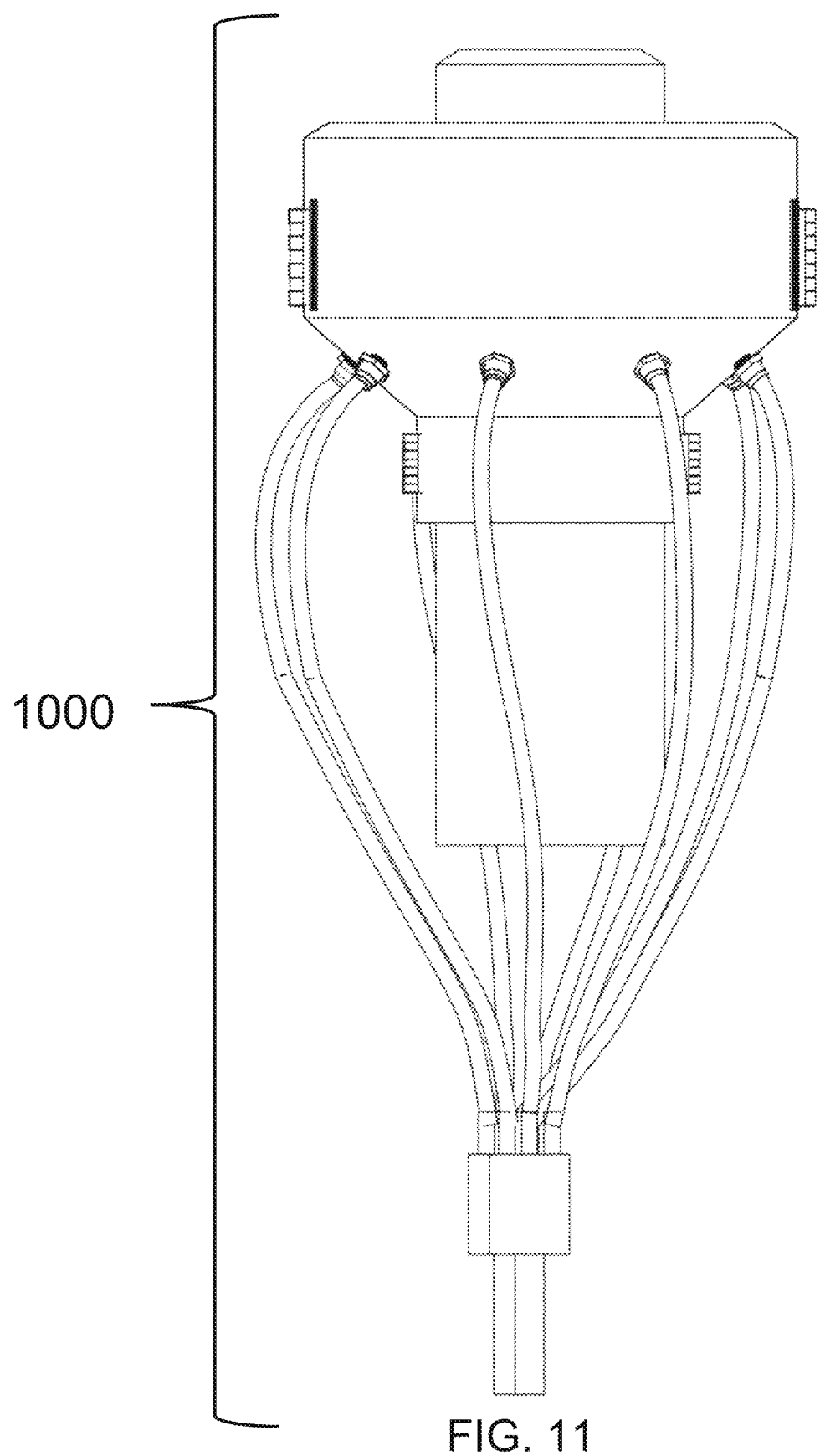
FIG. 11 is a front view of the split shell (1000) of a purge chamber (2000) installed on a workpiece (3000)
Figure 12:
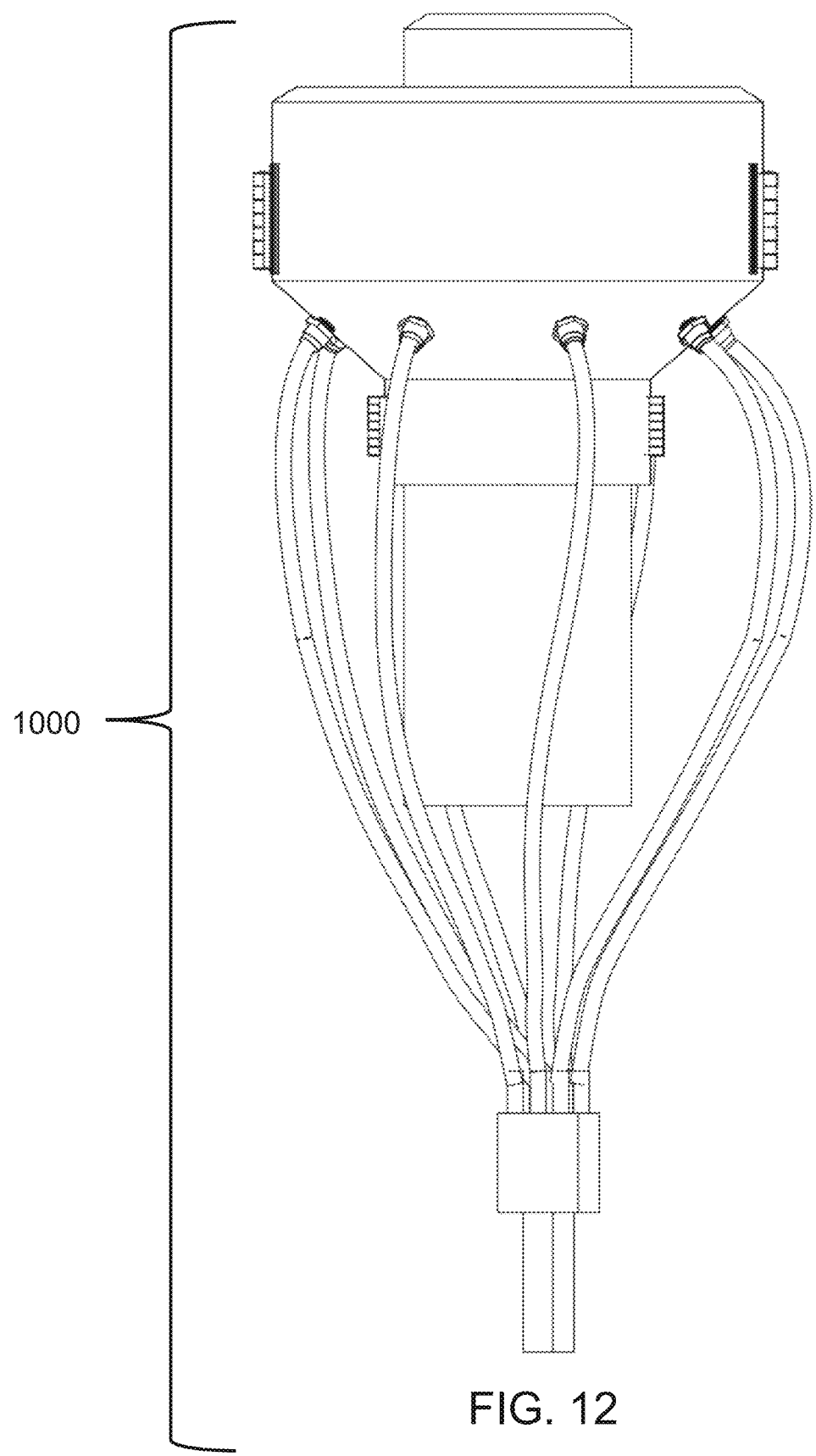
FIG. 12 is a rear view of the split shell (1000) of a purge chamber (2000) installed on a workpiece (3000)

FIG. 1 illustrates a front perspective view of the purge chamber (2000) installed on a tubular workpiece (3000), showcasing a weld joint (3100). The chamber comprises two opposing split-shell assemblies (1000), each formed from concentric reducers. The reducers include a narrowed receptacle (1101) that clamps around the workpiece (3000) and an expanded hood (1102) encapsulating the weld joint (3100). A recessed latch system (1110) secures the split shells (1000), compressing high-temperature silicone gaskets (1120) against the workpiece surface to create a gas-tight seal.

The hood (1102) features an access gap along its guide rim (1103), permitting unrestricted torch access to the weld joint (3100) while maintaining inert gas containment. Each split shell (1000) integrates a gas distribution network (1200) comprising eight ¼" hoses (1210) connected to a four-to-one manifold (1220). Argon flows through these hoses into layered diffusers—stainless steel wool (1130), fine woven mesh (1140), and perforated sheets (1150)—to achieve laminar flow within the hood (1102). This configuration minimizes turbulence, maintaining oxygen levels below 25 ppm. Opposing gas streams from both shells (1000) create balanced pressure, preventing air ingress during welding or cooling phases.

In the FIG. 1 embodiment, opposing gas flows from dual split-shell assemblies (1000) create balanced pressure within the purge chamber (2000), maintaining oxygen levels below 25 ppm. The concentric reducers (1101) clamp around the tubular workpiece (3000), encapsulating the weld joint (3100) within the hood (1102). Operators secure the chamber (2000) around pre-cleaned joints, initiate argon flow via the ¾" main inlet (1210), and monitor oxygen levels until <25 ppm is achieved. This configuration maintains inert shielding during welding and post-cooling phases, preventing delayed atmospheric contamination. The design accommodates upright, horizontal, or oblique workpiece orientations through adaptive sealing via silicone gaskets (1120) and recessed latches (1110).

FIG. 2 illustrates an alternative purge chamber (2000) configuration where the upper split shell (1000) replaces the gas distribution network (1200) with vented ports (1230). This leverages argon's higher density relative to air to displace oxygen through gravity-assisted venting. Operators follow the same workflow as FIG. 1—securing the chamber, purging via the main inlet (1210), and maintaining <25 ppm $O_2$—but with reduced gas consumption in vertical orientations. The vented design retains full encapsulation during welding and cooling, preventing air ingress even in complex oblique alignments.

FIGS. 3-4 and 6-12 detail the split-shell assembly (1000) comprising heat-resistant polymer reducers (1101) clamped around the workpiece (3000). The recessed latch system (1110) compresses silicone gaskets (1120) against the workpiece's (3000) surface, forming an airtight seal at the receptacle (1101). Argon flows through eight ¼" hoses (1210) connected to two four-to-one manifolds (1220), distributing gas radially through layered diffusers: stainless steel wool (1130), fine mesh (1140), and perforated plates (1150). These components eliminate turbulence, achieving laminar flow (<2,000 Reynolds number) across the weld joint (3100) within the hood (1102). The guide rim (1103) permits unrestricted TIG torch access while maintaining inert coverage.

FIG. 5 depicts a vented split shell (1000) where gas distribution ports (1230) serve dual purposes: inert gas injection or pressure-regulated venting. This modularity allows the chamber (2000) to adapt to vertical welding applications by exploiting argon's density to passive ambient air. Quick-connect adapters (1230) enable rapid reconfiguration between active gas distribution (FIG. 1) and vented modes (FIG. 2), optimizing gas efficiency for varying workpiece orientations.

Key technical enhancements of the embodiments depicted in FIGS. 1 through 12 include: Gas Dynamics: Explicit linkage of diffuser layers (1130/1140/1150) to laminar flow metrics; Modularity: Clear differentiation between active gas injection (FIG. 1) and passive venting (FIGS. 2,5); Orientation Independence: Unified operational protocol for upright/horizontal/oblique configurations; Sealing Mechanism: Emphasis on silicone gasket (1120) compression via recessed latches (1110).

Figure 13:
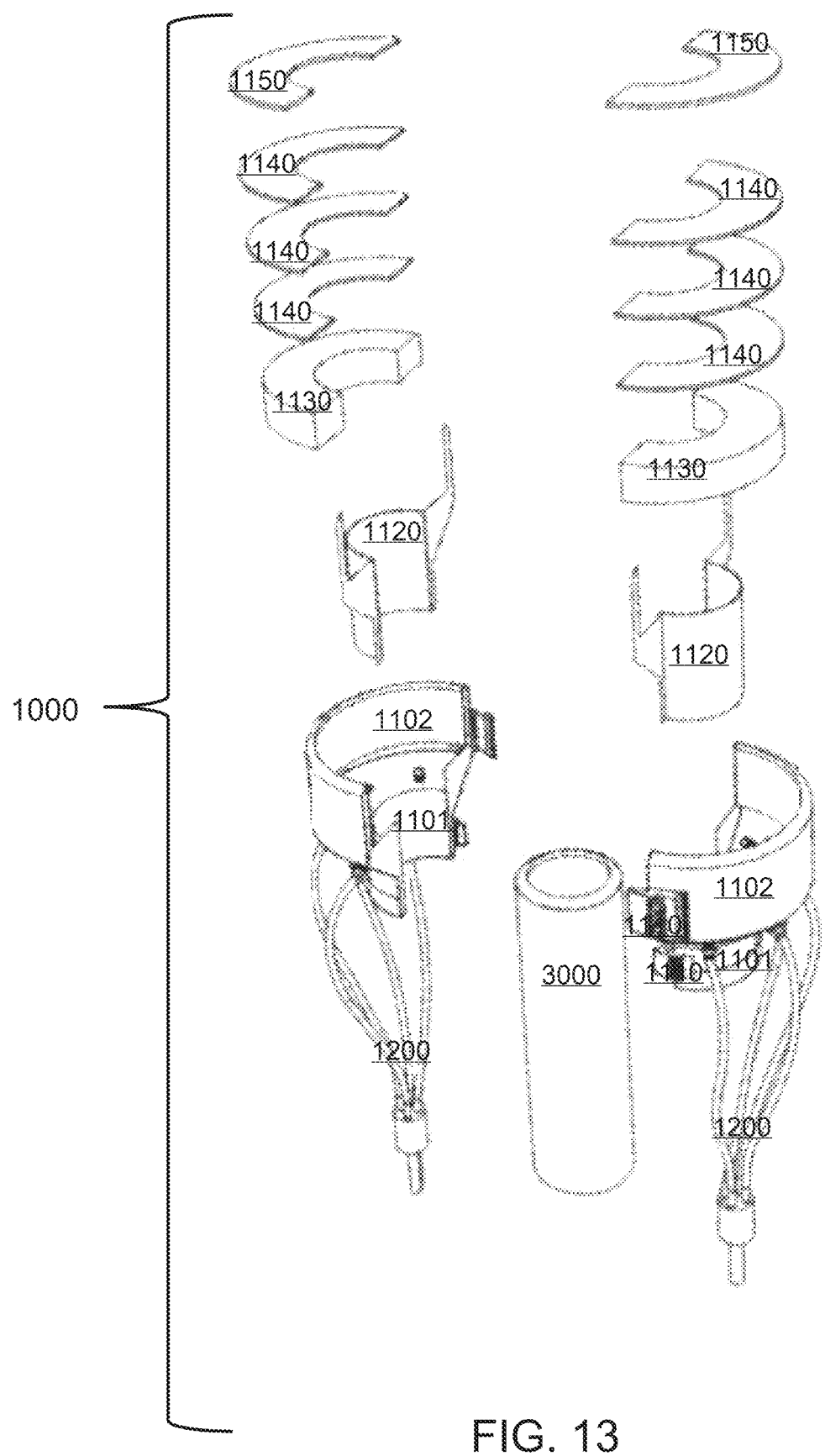
FIG. 13 is an exploded perspective view of the split shell (1000) of a purge chamber (2000) and workpiece (3000)
Figure 14:
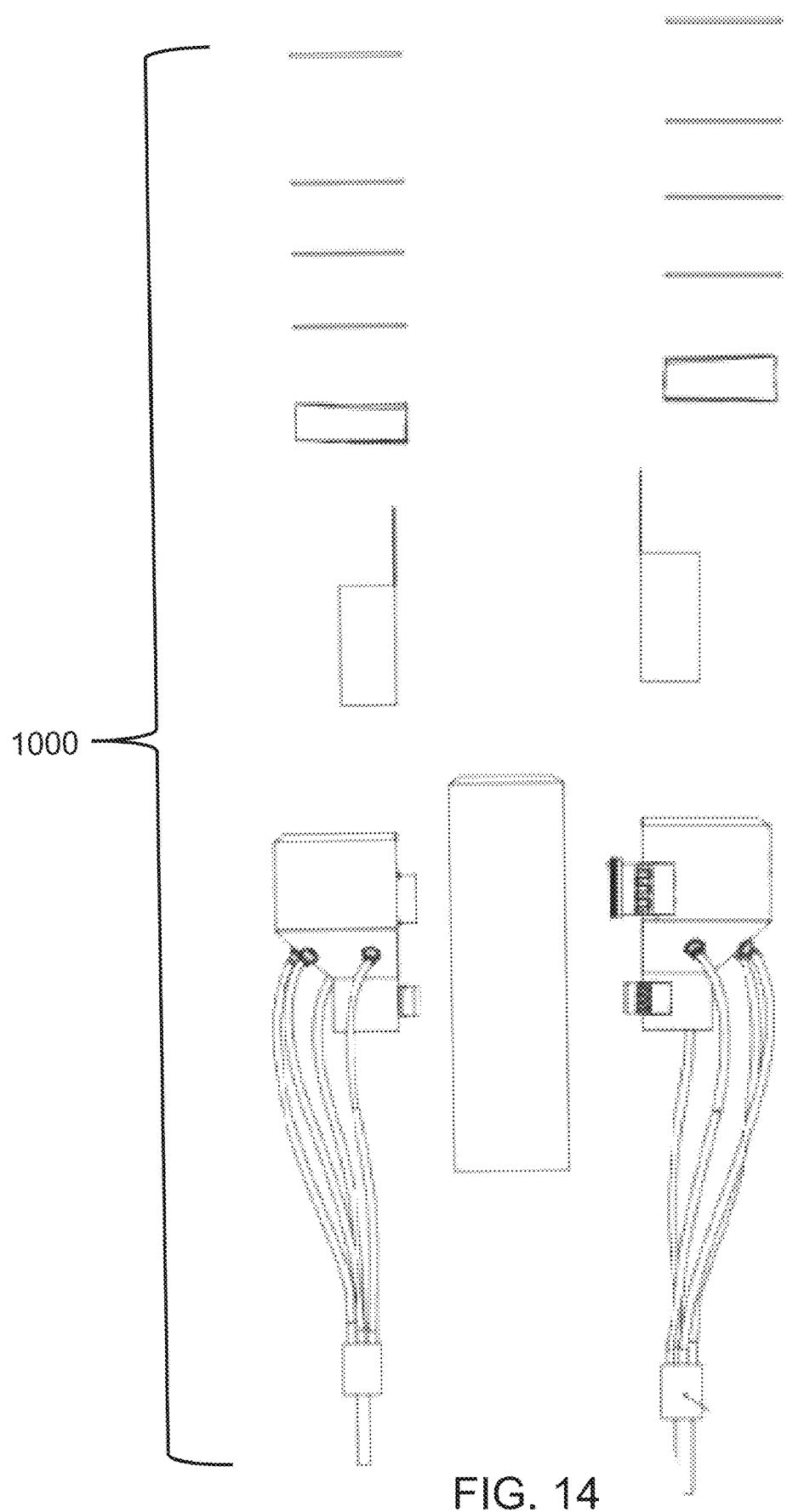
FIG. 14 an exploded side view of the split shell (1000) of a purge chamber (2000) and workpiece (3000)
Figure 15:
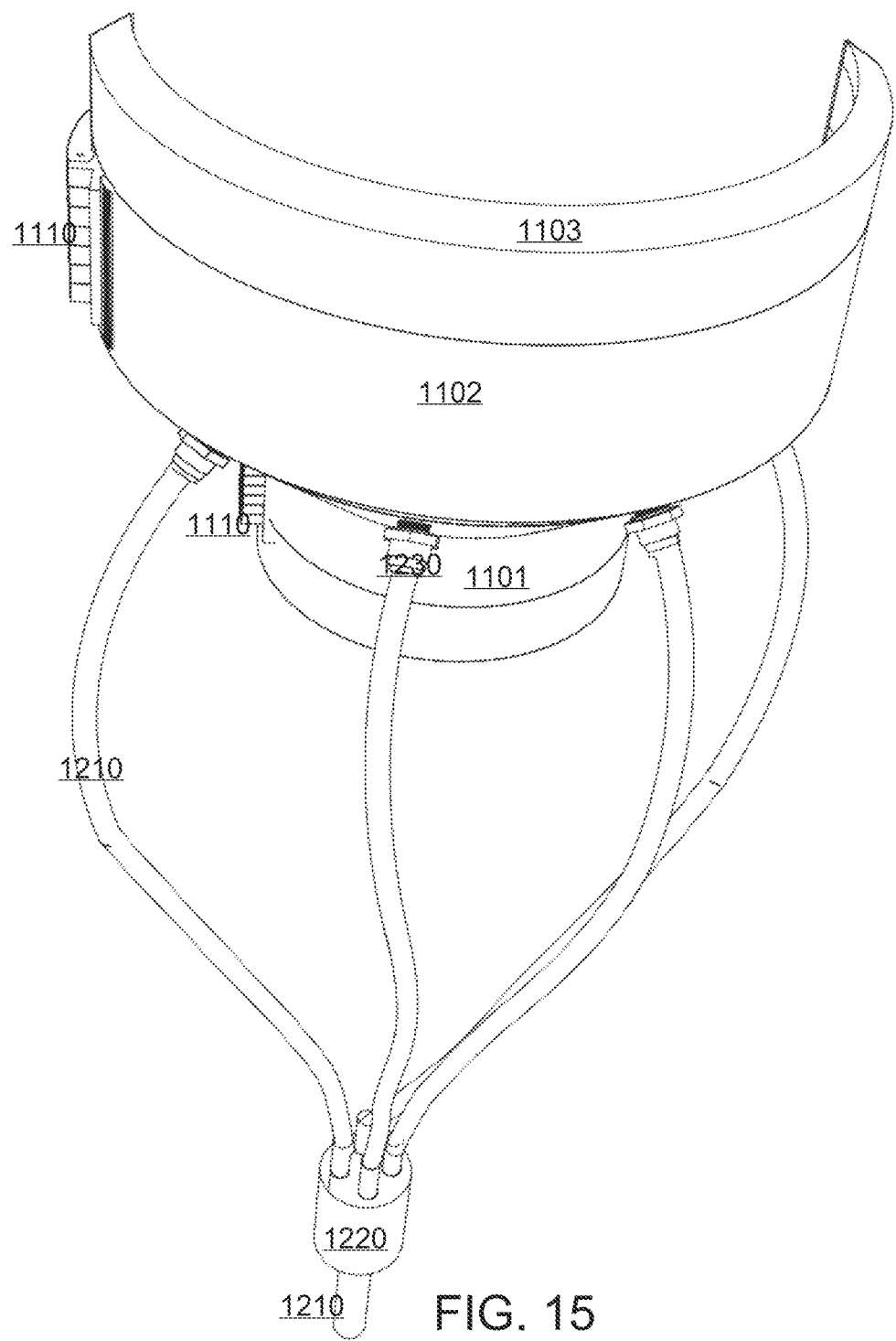
FIG. 15 is an outer perspective view of half of the split shell (1000)
Figure 16:
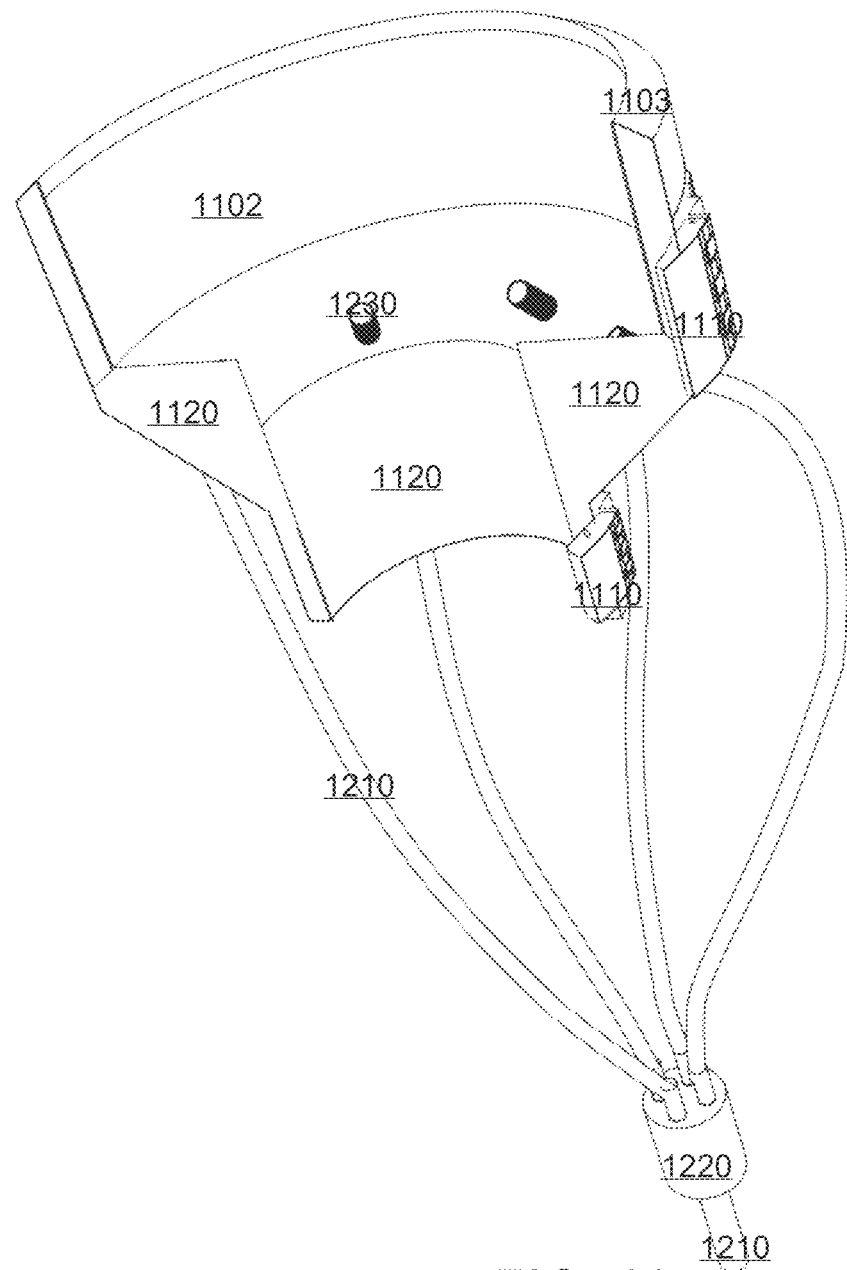
FIG. 16 is an inner perspective view of half of the split shell (1000)
Figure 17:
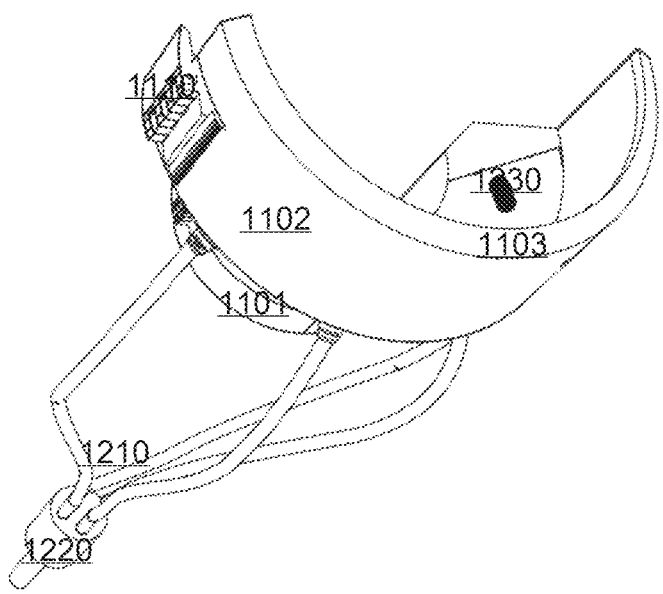
FIG. 17 is another perspective view of half of the split shell (1000)
Figure 18:
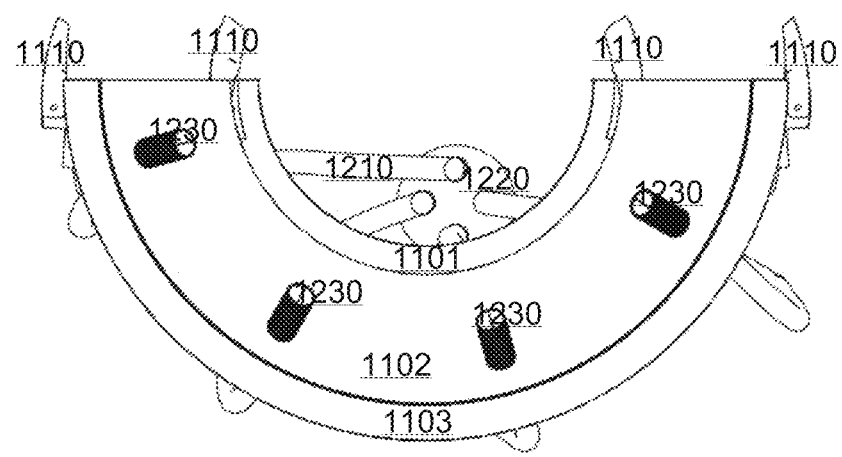
FIG. 18 is a top view of half of the split shell (1000)
Figure 19:
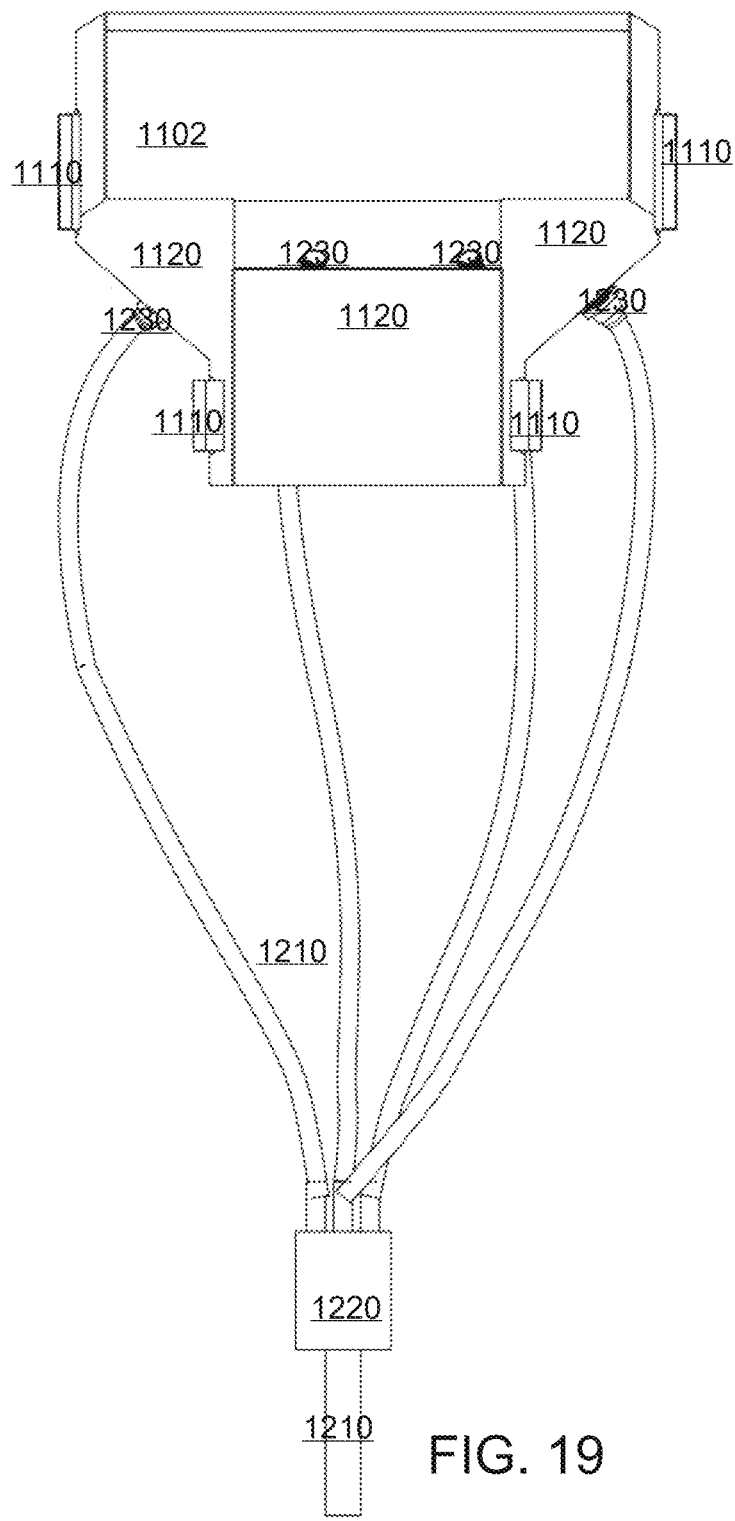
FIG. 19 is an inside view of half of the split shell (1000)

FIGS. 13 and 14 provide exploded perspective and side views of the split-shell assembly (1000) and workpiece (3000), detailing the purge chamber's (2000) modular construction. The assembly comprises two concentric reducers fabricated from split PVC or heat-resistant polymer shells, which clamp around the tubular workpiece (3000) via a receptacle (1101). A heat-resistant silicone gasket (1120) lines the inner circumference of the receptacle (1101) and the distal edges of each shell (1000), conforming to the workpiece surface to establish a gas-tight seal around the weld joint (3100).

Recessed latches (1110) on the hood (1102) and receptacle (1101) secure the shells (1000) during operation, compressing the silicone gasket (1120) to prevent air ingress. The hood (1102) integrates a gas distribution network (1200) featuring sequential diffuser layers:
Stainless Steel Wool (1130): Positioned at the gas inlet to dissipate turbulence.
Fine Woven Mesh (1140): Intermediate layer to homogenize flow distribution.
Perforated Sheet (1150): Final layer to direct laminar argon streams across the weld joint (3100).
These components collectively stabilize gas dynamics, maintaining oxygen levels below 25 ppm while optimizing argon utilization at 25-35 CFH. The exploded views emphasize the assembly's modularity, enabling rapid maintenance or reconfiguration for varying pipe diameters or reactive gas workflows.

FIGS. 15 through 19 depict the split-shell (1000) and its integrated gas distribution network (1200). The half-shell (1000), formed from a heat-resistant polymer or PVC concentric reducer, comprises a hemispherical structure divided along its longitudinal axis. The larger diameter portion forms the hood (1102), while the reduced section defines the receptacle (1101), enabling the shell (1000) to clamp around tubular workpieces (3000) via opposing latches (1110). A beveled guide rim (1103) along the hood's (1102) edge facilitates precise torch positioning during welding operations, ensuring unrestricted access to the weld joint (3100) while maintaining inert gas containment. In some cases, a welding torch may be set against the rim (1103) during welding as a support or guide for the torch.

The receptacle (1101) incorporates a heat-resistant silicone gasket (1120) (FIG. 19) that conforms to the workpiece (3000) surface, creating an airtight seal adjacent to the weld joint (3100). Recessed latches (1110) on the hood (1102) and receptacle (1101) compress the gasket (1120) during closure, preventing atmospheric ingress while allowing rapid assembly and disassembly.

The gas distribution network (1200) within the hood (1102) includes four ¼" hoses (1210) connected to a four-to-one manifold (1220). Argon flows from a single source hose (1210) through the manifold (1220) into the four hoses (1210), which terminate at quick-connect adapters (1230) mounted on the hood (1102). These adapters (1230) enable modular coupling to external gas lines or auxiliary reactive gas injectors, ensuring laminar gas flow across the weld zone.

In prototype configurations, the split-shell (1000) mimics a standard pipe reducer fitting, with the hood (1102) and receptacle (1101) proportioned to accommodate pipe diameter variances up to ±10%. This design ensures compatibility with conventional piping systems while providing a guided, contamination-free environment for welding reactive metals.

Figure 20:
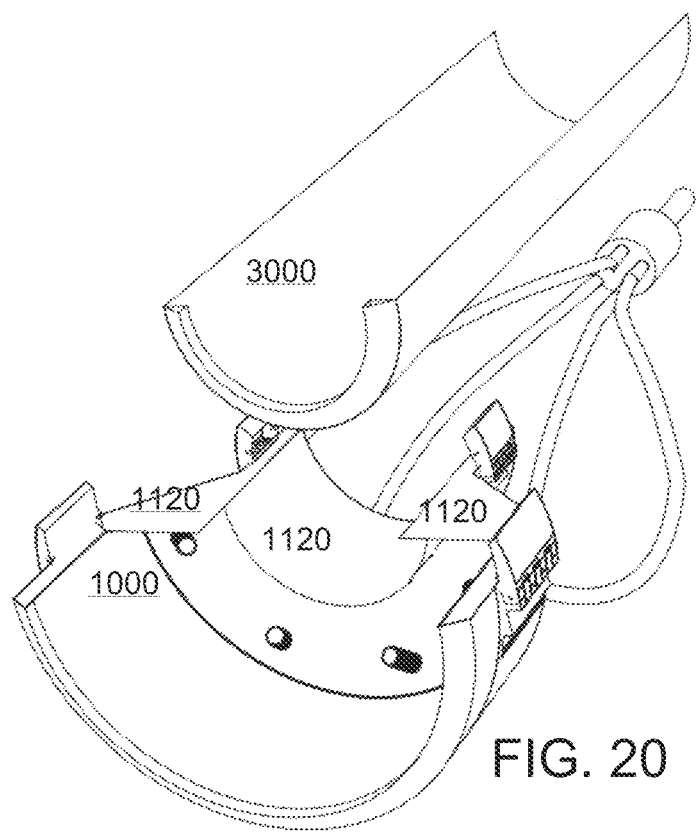
FIG. 20 is an exploded perspective view of half a work piece (1000) and half of the split shell (1000) side view of the one side of a purge chamber (2000) constructed of two sides of purge chamber devices (1000)
Figure 21:
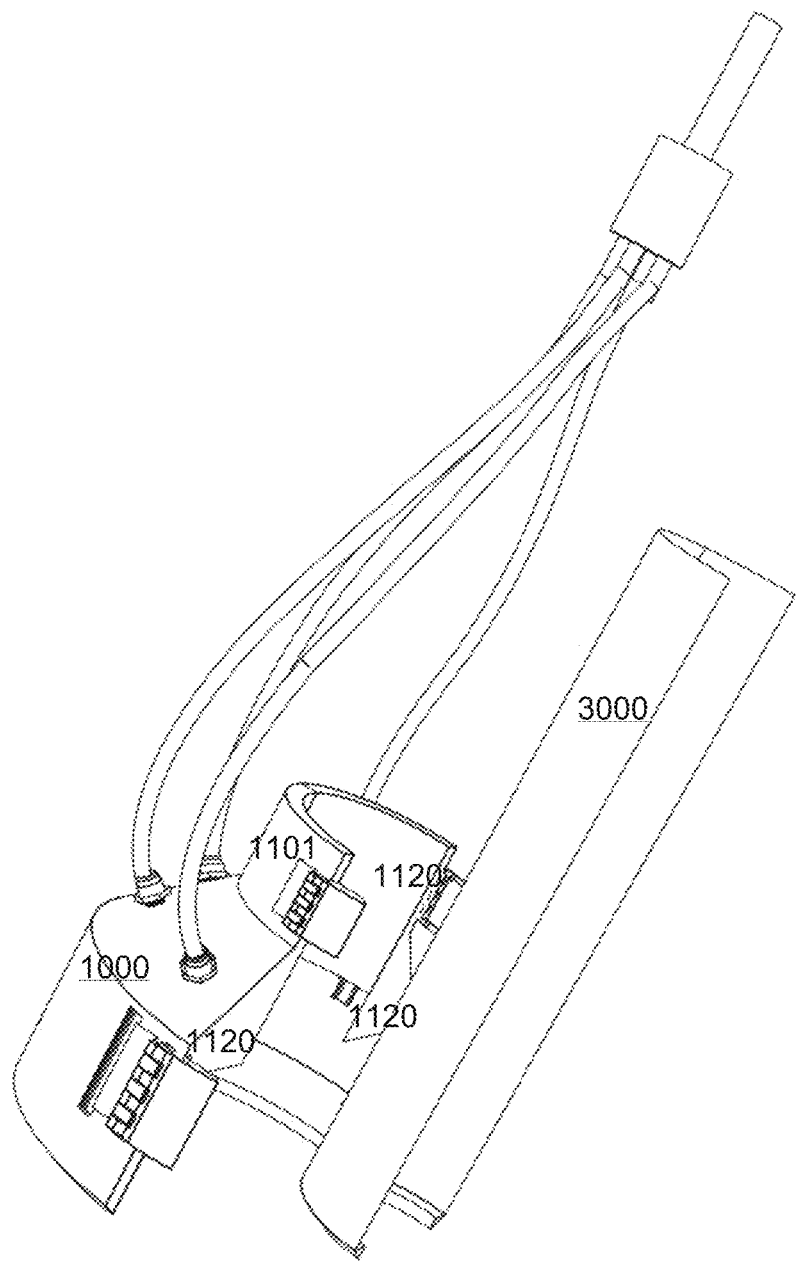
FIG. 21 is another exploded perspective view of half a work piece (1000) and half of the split shell (1000) side view of the one side of a purge chamber (2000) constructed of two sides of purge chamber devices (1000)
Figure 22:
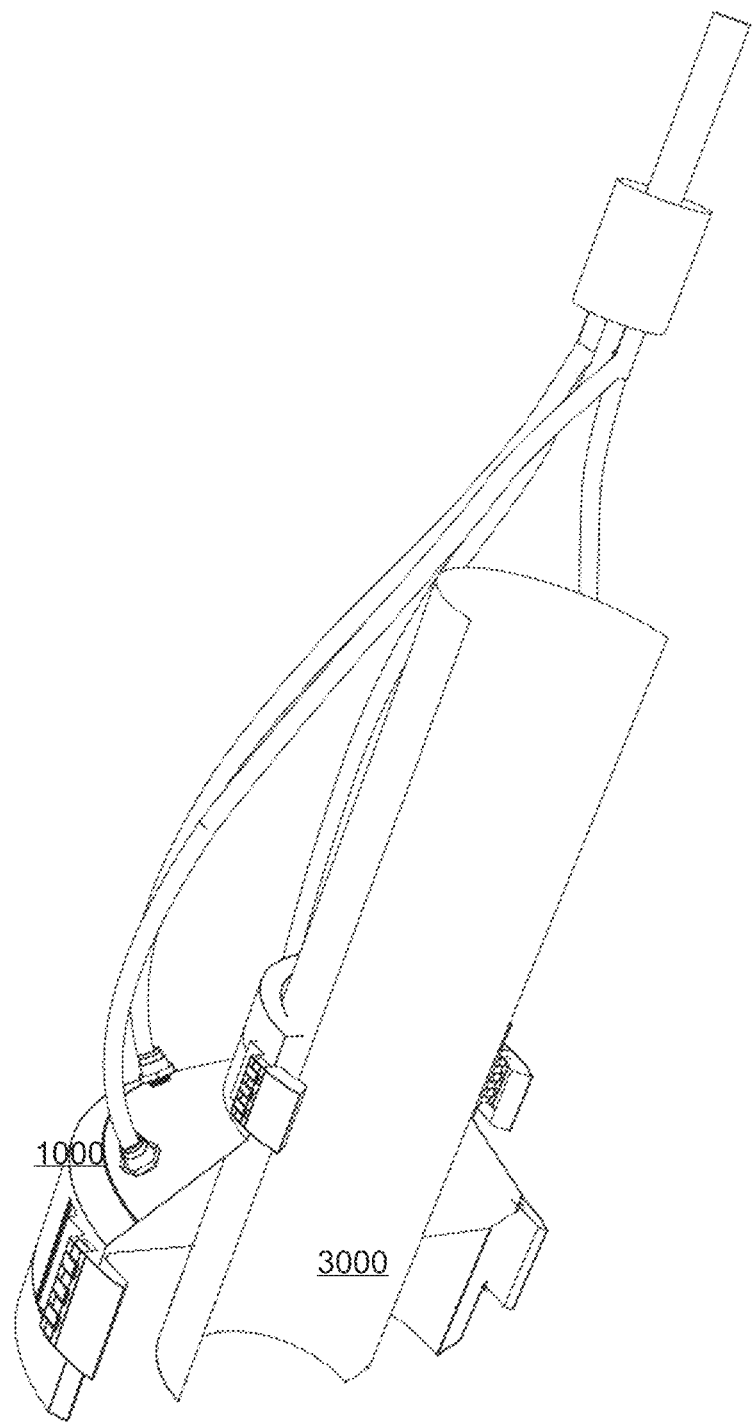
FIG. 22 is an exploded perspective view of half a work piece (1000) installed in half of the split shell (1000) side view of the one side of a purge chamber (2000) constructed of two sides of purge chamber devices (1000)
Figure 23:
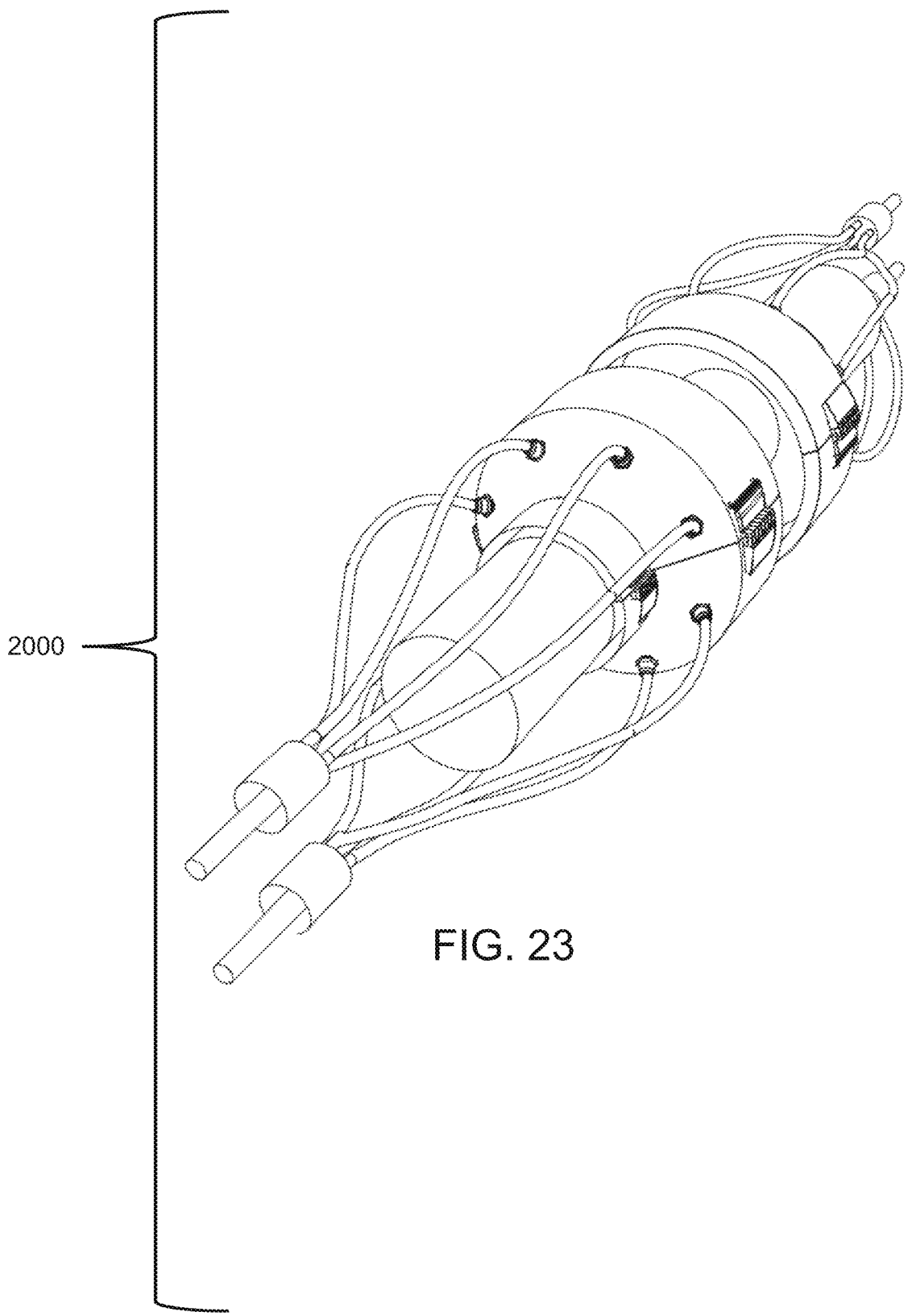
FIG. 23 is a perspective view of a purge chamber (2000) constructed of two split cells (1000) installed on a workpiece (3000)
Figure 24:
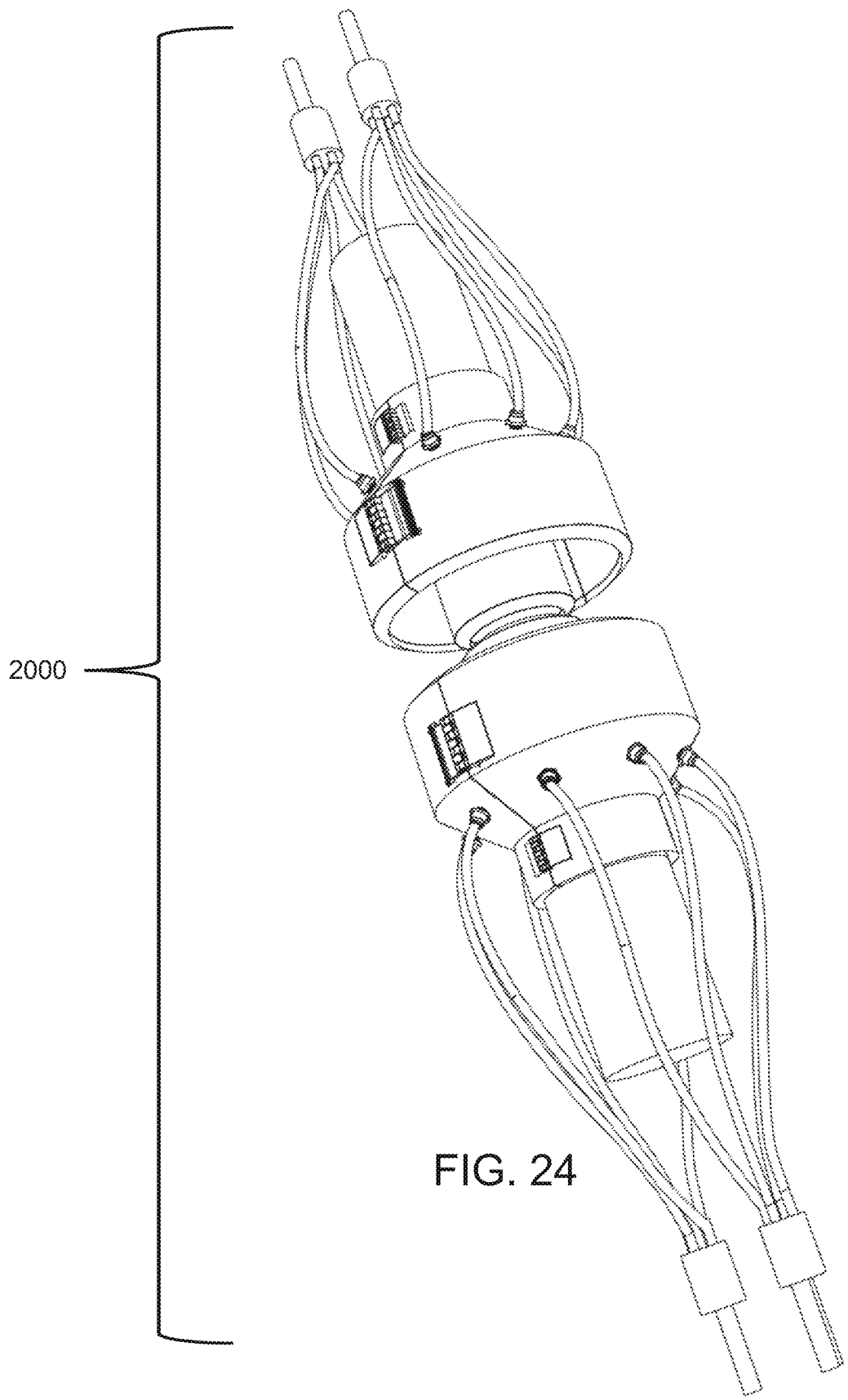
FIG. 24 is another perspective view of a purge chamber (2000) constructed of two split cells (1000) installed on a workpiece (3000); and, FIG. 25 is an exploded view of a purge chamber (2000) constructed of two split cells (1000) installed on a workpiece (3000) and heat resistant tape (1300) with a window (1310).
Figure 25:
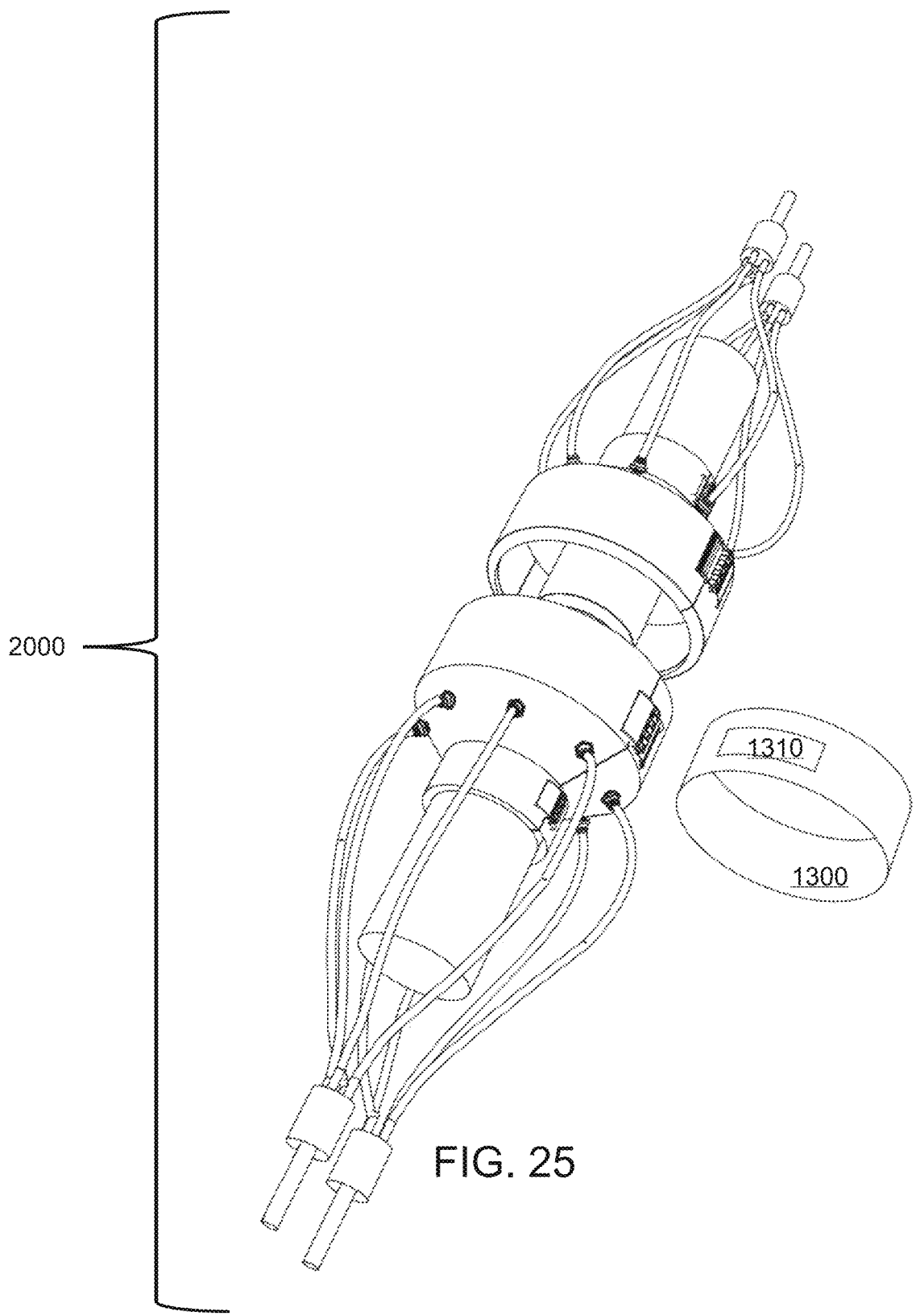

The recessed latch system (1110) ensures a gas-tight interface between the concentric reducer shell (1000) and the workpiece (3000) by compressing a silicone gasket (1120) against the workpiece surface adjacent to the weld joint (3100). FIGS. 20 and 21 detail the gasket (1120) installation, which lines the inner surface of the receptacle (1101) and the distal edges of the shell (1000). When the workpiece (3000) is positioned within the receptacle (1101) (FIG. 22), the gasket (1120) conforms to the workpiece surface, forming a preliminary seal. Clamping a second shell (not shown) onto the opposing side of the workpiece (3000) and engaging the latches (1110) compresses the gasket (1120) uniformly, creating a hermetic seal around the weld joint (3100). This compression mechanism eliminates air gaps even on irregular surfaces, maintaining oxygen levels below 25 ppm. The system's modularity allows adaptation to varying workpiece diameters (±10%) without custom tooling, addressing a critical limitation of prior rigid shielding systems (e.g., U.S. Pat. No. 4,562,334). Additionally, this latch-gasket synergy ensures contamination-free welding across orientations while simplifying setup—key advancements over skill-dependent trailing shields like Huntingdon Fusion's Argweld® models.

The purge chamber (2000) is assembled by securing two split-shell assemblies (1000) on either side of the workpiece (3000), with latches (1110) engaged to compress silicone gaskets (1120) against the workpiece surface adjacent to the weld joint (3100). FIGS. 1, 2, and 23-25 illustrate this configuration, where the chamber (2000) encapsulates the weld joint (3100) within the hoods (1102) of the shells (1000). A longitudinal access gap between the shells permits TIG torch entry while maintaining inert gas coverage due to laminar flow dynamics and argon's higher density relative to air, minimizing gas leakage. To further mitigate inert gas loss, heat-resistant tape (1300) (FIG. 25) seals the access gap during non-welding intervals (e.g., cooling phases or setup adjustments). The tape (1300) incorporates a transparent window (1310), optionally paired with internal LED lighting, enabling real-time weld inspection without compromising the inert atmosphere. Operators remove the tape (1300) during active welding and reapply it during pauses, ensuring continuous oxygen levels<25 ppm. Key Features of this configuration include:

Laminar Flow Retention: Layered diffusers (1130/1140/1150) maintain argon density gradients, minimizing leakage through the access gap.

Modular Sealing: Heat-resistant tape (1300) adapts to varying gap widths (±5 mm) while withstanding temperatures up to 500° C.

Operational Flexibility: Window (1310) supports visual or automated monitoring (e.g., CCD cameras) of weld quality. This configuration resolves prior art limitations (e.g., Huntingdon Fusion trailing shields) by combining full encapsulation with operator accessibility, reducing argon waste by 40-60% compared to open shielding systems.

Method for Eliminating Welding Contamination Using the Purge Chamber The purge chamber (2000) resolves oxidation and contamination challenges in reactive metal welding by creating a controlled inert atmosphere around the weld joint (3100). This ensures defect-free welds on titanium, zirconium, aluminum, and other oxidation-prone metals. Below is a detailed workflow for effective implementation:

1. Pre-Welding Preparation—Begin by thoroughly cleaning the workpiece (3000) surfaces adjacent to the weld joint (3100) using acetone or a compatible solvent to remove oils, grease, and debris. Inspect the purge chamber components—including the concentric reducers (1000), silicone gaskets (1120), latches (1110), and gas distribution hoses (1210)—for integrity. Secure the aligned pipe sections using welding clamps or fixtures to prevent misalignment during chamber installation.

2. Chamber Assembly and Sealing—Open the recessed latches (1110) and position the split-shell assemblies (1000) around the workpiece (3000), ensuring the weld joint (3100) is centered within the hoods (1102). Engage the latches (1110) to compress the silicone gaskets (1120) against the workpiece, forming an airtight seal. For irregular surfaces, supplement the seal with heat-resistant tape (1300) along the guide rim (1103) to eliminate gas leakage.

3. Inert Gas Purging—Connect the main argon inlet hose (1210) to the gas distribution network (1200) and initiate argon flow at 25-35 CFH. The stainless steel wool (1130), fine mesh (1140), and perforated sheet (1150) diffusers ensure laminar gas distribution, displacing atmospheric oxygen. Monitor oxygen levels via an inline sensor until concentrations fall below 25 ppm. Adjust vent holes (1230) to maintain internal pressure at 0.5-1.5 psi, preventing overpressurization.

4. Welding Execution and Monitoring—Perform TIG or MIG welding through the access gap between the split shells (1000), leveraging the transparent viewing window (1310) for real-time inspection. If oxidation or discoloration occurs, increase argon flow or inspect for seal breaches. The high-heat silicone padding (1120) protects the workpiece (3000) from thermal damage during prolonged welding cycles.

5. Post-Weld Protocol—For most materials, it may be desirable to maintain argon flow until the weld cools below 400° C. to prevent delayed oxidation. For Zirconium, it may be preferable to maintain inert gas flow until the weld cools to 315° C. and for Titanium 371° C. After cooling, shut off the gas supply, disengage the latches (1110), and remove the purge chamber (2000). Inspect the weld for defects and clean the chamber components for storage.

Industrial applications enabled by the purge chamber (2000) and the above described method include:
1. Aerospace Titanium Components: Precision-welded titanium joints (3100) for airframe structures or jet engine parts, where oxidation-free seams are critical for fatigue resistance.
2. Zirconium Nuclear Reactor Piping: Contamination-free welds in zirconium alloy coolant channels, preventing hydride-induced embrittlement in reactor cores.
3. Beryllium-Aluminum Optical Mounts: Low-distortion welding of Be—Al alloys for satellite instrumentation, avoiding toxic oxide formation.
4. High-Purity Pharmaceutical Vessels: Austenitic stainless steel or aluminum tanks welded under inert conditions to meet FDA-grade cleanliness standards.
5. Additive-Manufactured Hybrid Parts: Post-print welding of titanium or niobium 3D-printed components for custom aerospace or medical implants.

Technical Advantages Over Conventional Methods

Reduced Skill Dependency: Novice welders achieve 83% oxidation-free success rates (vs. 22% with trailing shields) due to static encapsulation.

Gas Efficiency: Laminar flow diffusers cut argon consumption by 40-60% compared to turbulent shielding systems.

Multi-Metal Compatibility: Supports welding of uranium, tantalum, and rhenium alloys for nuclear or high-temperature applications.

By integrating modular encapsulation, hybrid gas workflows, and turbulence-free diffusion, the purge chamber (2000) sets a new standard for contamination-free welding across industries requiring ultra-high-purity joints.

Deficiencies of Conventional Trailing Shields—Traditional trailing shields (e.g., Huntingdon Fusion models) demand continuous operator pressure against the workpiece (3000) to maintain inert coverage, particularly challenging on thin-walled pipes where heat dissipation risks seal failure. Imperfect sealing allows atmospheric gases to infiltrate, causing oxidation, discoloration, and embrittlement at the weld joint (3100). These systems also restrict torch mobility, struggle with complex geometries (e.g., mitered joints), and require advanced operator skill, leading to frequent defects, rework, and material waste.

Purge Chamber's Encapsulation Advantage—The purge chamber (2000) resolves these issues by fully encapsulating the weld joint (3100) within a static inert environment. Unlike trailing shields, which only protect the immediate arc zone, the chamber's split-shell assemblies (1000) and silicone gaskets (1120) maintain oxygen levels<25 ppm throughout welding and cooling. This eliminates atmospheric exposure, ensuring contamination-free welds without requiring operator skill to manually adjust shielding.

Empirical Validation at Kentucky Welding Institute—Testing at the Kentucky Welding Institute compared the purge chamber (2000) against traditional trailing shields. Novice welders achieved 83% oxidation-free titanium welds with the chamber versus 22% using trailing shields. The gas distribution network (1200) and laminar flow diffusers (1130/1140/1150) maintained an inert atmosphere, preventing oxide formation on filler metals. Students reported unrestricted torch movement through the access gap, contrasting with trailing shields' rigid positioning demands.

Aluminum Welding Breakthrough—While aluminum welding typically suffers from oxide layers ($Al_2O_3$ melting point: 3,680° F. vs. base metal: 1,218° F.), the purge chamber (2000) eliminates this issue. By enclosing the weld joint (3100) and heat-affected zone (HAZ) within an argon-rich hood (1102), the chamber prevents oxide nucleation. This enables clean, spatter-free aluminum welds—critical for aerospace and automotive applications.

Operational Flexibility and Torch Control—The purge chamber's (2000) recessed latches (1110) and guide rim (1103) allow unhindered torch access, unlike trailing shields that constrain welder movement. During testing, novices could reposition the torch without breaking inert coverage, even with unsteady hands. The chamber's static design ensures uniform argon flow (25-35 CFH) via the gas distribution network (1200), eliminating manual pressure adjustments.

Enhanced Training and Usability—At the Kentucky Welding Institute, trainees welding titanium with trailing shields struggled to maintain shield contact, risking oxidation. The purge chamber (2000) resolved this via its self-sealing split shells (1000) and silicone gaskets (1120). The heat-transparent window (1310) provided real-time visibility, enabling trainees to correct techniques without contamination—a critical advantage for reactive metals like zirconium and beryllium-aluminum.

Real-Time Quality Assurance—The purge chamber's (2000) viewing window (1310), augmented by optional LED lighting, allows welders to detect defects (e.g., porosity, undercut) during deposition. This contrasts with trailing shields, which obscure the weld pool. For aluminum, the chamber's oxide-free environment reduces post-weld grinding, while for titanium, it prevents the brittle α-case layer that plagues conventional methods.

Technical Superiority—
Gas Efficiency: Laminar flow via diffusers (1130/1140/1150) reduces argon use by 40-60% vs. trailing shields.
Multi-Metal Compatibility: Validated for Zr, Hf, Be—Al, Ta, and U alloys.
Skill Democratization: 83% novice success rate vs. 22% with trailing shields.
By integrating full encapsulation, turbulence-free flow, and modular adaptability, the purge chamber (2000) redefines reactive metal welding across aerospace, nuclear, and additive manufacturing sectors.

The purge chamber (2000) comprises modular components designed to create a sealed inert environment for welding reactive metals. Central to the system are concentric reducers (1000), fabricated from heat-resistant PVC or polymer, split longitudinally to clamp around the workpiece (3000). These reducers (1000), sized for compatibility with 2" SCH 80 piping, integrate a recessed latch system (1110) positioned 180° apart to ensure airtight closure. The latches (1110) compress high-heat silicone padding (1120) against the workpiece, forming a gas-tight seal while accommodating ±10% diameter variance.

Gas distribution is managed via a network of eight ¼" clear flexible hoses (1210) connected to a ¾" main argon inlet (1210). A four-to-one manifold (1220) ensures uniform argon flow, while stainless steel wool (1130) and fine mesh screens (1140) within the hood (1102) eliminate turbulence, achieving laminar flow (<2,000 Reynolds number). Optional vent holes (1230) regulate internal pressure (0.5-1.5 psi) to prevent over-pressurization.

User accessibility is enhanced by a purge chamber gap between reducers (1000), permitting TIG torch access to the weld joint (3100). Heat-resistant tape (1300) seals this gap during non-welding intervals, and a transparent polycarbonate window (1310) allows real-time inspection. For multipass welding, quick-release latches (1110) enable rapid chamber repositioning without breaking inert coverage.

Additional components include threaded barbed fittings (1230) for secure hose connections and optional adjustable brackets for stabilizing the chamber on irregular workpieces. The system's adaptability extends to hybrid workflows, where auxiliary ports (1230) inject reactive gases like $CCl_4$ for in-situ oxide removal.

System Synergy
Structural Integrity: Concentric reducers (1000) and latches (1110) form a rigid enclosure, isolating the weld joint (3100) from atmospheric gases.
Gas Control: Argon flows from the inlet (1210) through the manifold (1220) and diffusers (1130/1140), ensuring <25 ppm oxygen levels.
Operational Flexibility: The access gap and window (1310) allow unrestricted torch movement and visual monitoring, critical for complex geometries.
Sealing Redundancy: Silicone padding (1120) and heat-resistant tape (1300) provide dual sealing mechanisms, preventing leaks even in high-temperature environments.
This integrated design reduces argon consumption by 40-60% compared to trailing shields, democratizes operator skill requirements, and ensures contamination-free welds across titanium, zirconium, and aluminum applications.

Operational Mechanics of the Purge Chamber—he purge chamber (2000) maintains a contamination-free welding environment by fully encapsulating the weld joint (3100) within an argon-rich atmosphere. Concentric reducers (1000), split longitudinally and secured via a recessed latch system (1110), form a sealed enclosure around the workpiece (3000). Argon gas enters through the main inlet hose (1210), flows into a four-to-one manifold (1220), and distributes evenly via eight ¼" hoses (1210) to ensure uniform coverage. Stainless steel wool (1130) and fine mesh diffusers (1140) eliminate turbulence, achieving laminar flow (<2,000 Reynolds number) critical for oxygen levels below 25 ppm.

Heat-resistant tape (1300) seals the access gap between reducers (1000), permitting TIG torch entry while minimizing gas leakage. Transparent viewing windows (1310), integrated into the hood (1102), enable real-time weld monitoring without disrupting inert conditions. Adjustable vent holes (1230) regulate internal pressure (0.5-1.5 psi), preventing over-pressurization during multi-pass welding. High-heat silicone padding (1120) lines the receptacle (1101), protecting the workpiece (3000) from thermal damage while enhancing seal integrity.

This integrated system eliminates oxidation in titanium, zirconium, and aluminum welds by combining static encapsulation, turbulence-free gas distribution, and modular accessibility-resolving the skill dependency and gas waste inherent in trailing shields.

A fabrication methodology for constructing a shell (1000) includes the steps of:
Concentric Reducers (1000) Preparation—Split PVC or polymer reducers longitudinally and smooth edges to prevent seal breaches. Install recessed latches (1110) on both halves, ensuring alignment for airtight closure.
Gas Distribution Assembly—Drill eight equidistant ports at the hood's (1102) transition angle (2" to 4" diameter). Thread barbed fittings (1230) into the ports and connect ¼" hoses (1210) to a manifold (1220). Insert stainless steel wool (1130) and fine mesh (1140) into the hood (1102) to diffuse argon streams.
Sealing System Integration—Apply silicone gaskets (1120) to the receptacle (1101) and distal edges of the reducers (1000). Secure adjustable brackets (if used) to stabilize the chamber on irregular workpieces.

Functional Testing—Pressurize the chamber (2000) with argon at 25-35 CFH, checking for leaks at latches (1110) and hose fittings (1230). Conduct trial welds on titanium samples, verifying oxidation-free results via the viewing window (1310).

Optional Enhancements for the shell (1000) include: Vented Shells (1230 (FIG. 2)): Ports on the upper reducer (1000) allow passive argon venting in vertical orientations, leveraging gas density for efficient oxygen displacement. Modular Clamps (1110): Supplementary clamps stabilize the chamber (2000) on thin-walled or vibrating workpieces. Robotic Mounting Brackets: Aluminum brackets align the chamber (2000) with automated welding systems for additive manufacturing or nuclear pipe welding. Reactive Gas Ports (1230): Auxiliary fittings enable $CCl_4$/HCl injection for in-situ oxide removal per Jordan's method (U.S. Pat. No. 2,576,793). These enhancements broaden the purge chamber's (2000) applicability across aerospace, nuclear, and hybrid manufacturing workflows while retaining core functionality.

Core Components and System Integration—The purge chamber (2000) comprises concentric reducers (1000)—split PVC or polymer shells clamped around the workpiece (3000) via a recessed latch system (1110). The reducers (1000) encapsulate the weld joint (3100) within a hood (1102), sealed by silicone gaskets (1120) and heat-resistant tape (1300). Argon flows through a ¾" main inlet (1210), distributing via eight ¼" hoses (1210) connected to a manifold (1220). Stainless steel wool (1130) and fine mesh diffusers (1140) ensure laminar flow (<25 ppm $O_2$) across the weld zone. A transparent viewing window (1310) allows real-time inspection, while vent holes (1230) regulate internal pressure (0.5-1.5 psi).

Optional Enhancements—To expand functionality, the chamber (2000) supports modular adaptations:

Automated Gas Control: Integrated flow sensors and smart valves (1230) adjust argon distribution dynamically, reducing waste.

Hybrid Gas Compatibility: Auxiliary ports (1230) enable helium or nitrogen injection for specialized alloys (e.g., beryllium-aluminum).

Magnetic Positioning: Neodymium strips secure reducers (1000) to ferrous workpieces without clamps.

Multi-Zone Purging: Segmented hoods (1102) isolate weld sections for complex geometries.

AI-Driven Monitoring: Wireless sensors relay oxygen levels and thermal data to a mobile interface, enabling remote adjustments.

There are also alternative configurations, including:

1. Material Flexibility: Replace PVC reducers (1000) with carbon fiber or titanium-coated alloys for extreme heat resistance. Other materials include plastic mold injections, heat resistant polymers, plastic printing, fiberglass, composite materials, PVC materials, and etc.

2. Gas Delivery Innovations: Substitute hoses (1210) with micro-channeled manifolds (1220) molded into the hood (1102).

3. Modular Scalability: Telescoping reducers (1000) adapt to pipe diameters from 1" to 6" via interlocking segments.

4. Rotational Systems: Motorized hoods (1102) rotate synchronously with orbital welding arms for circumferential joints.

5. Vacuum Sealing: Replace silicone gaskets (1120) with suction-based seals for irregular surfaces.

Structural and Safety Upgrades

Self-Purging Mechanism: A vacuum pump (1230) evacuates residual oxygen before argon injection.

Thermal Management: Water-cooled walls (1120) dissipate heat during prolonged welds.

Emergency Protocols: Pressure-relief valves (1230) and auto-shutdown sensors (1230) prevent over-pressurization.

Augmented Reality (AR): A heads-up display projected onto the window (1310) overlays weld parameters (amperage, gas flow).

The purge chamber (2000) has various versions of industrial adaptability, including:

Additive Manufacturing: Mount the chamber (2000) on robotic arms for contamination-free wire-arc AM of titanium.

Field Repairs: A collapsible frame with ergonomic handles enables rapid deployment in offshore or remote settings.

Multi-Metal Welding: Interchangeable diffuser cartridges (1130/1140) optimize gas flow for aluminum, zirconium, or uranium.

By integrating core components (1000-1310) with modular enhancements, the purge chamber (2000) resolves prior art deficiencies in gas efficiency, operator skill dependency, and contamination control. Its adaptability across aerospace, nuclear, and additive manufacturing applications establishes a new benchmark for reactive metal welding.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments.

Adaptability and Cross-Industry Applications of the Purge Chamber—The purge chamber (2000), while described in the context of welding reactive metals, is not limited to the embodiments detailed herein. Features such as the concentric reducers (1000), gas distribution network (1200), and recessed latch system (1110) can be combined or reconfigured across applications, whether or not explicitly depicted. For instance, the laminar flow diffusers (1130/1140/1150) and modular sealing mechanisms (1120/1300) may be adapted to non-welding environments requiring controlled atmospheres. Below are transformative applications beyond conventional welding:

Aerospace & Aviation—The chamber's inert environment is critical for welding titanium aircraft components (e.g., jet engine mounts) and fabricating spacecraft structures under vacuum-like conditions. Its silicone gaskets (1120) and gas-tight seals prevent oxygen ingress during repairs or manufacturing of aerospace-grade alloys.

Semiconductor & Electronics—adapted for semiconductor fabrication, the purge chamber (2000) could shield microchip bonding processes from moisture and airborne contaminants. The transparent viewing window (1310) and argon shielding would enhance precision in circuit board soldering, eliminating oxidation on nanoscale joints.

Medical & Biotechnology—In medical implant manufacturing, the chamber's controlled atmosphere ensures oxidation-free welding of biocompatible titanium prosthetics. Modified with sterile filtration, it could create bacteria-free environments for lab-grown tissue engineering or bioassay preparation.

Food & Beverage Processing—Retrofitted with vacuum-sealing capabilities, the chamber (2000) could purge oxygen from food packaging, extending shelf life. For fermentation, its gas distribution network (1200) might maintain nitrogen-rich environments for anaerobic brewing processes.

Additive Manufacturing—Integrated with 3D metal printers, the chamber (2000) provides an oxygen-free zone for laser sintering of titanium or aluminum powders. Hybrid welding-printing workflows could leverage its laminar flow diffusers (1130/1140) to prevent interlayer oxidation.

Energy & Nuclear Systems—For nuclear reactor piping, the chamber's static encapsulation ensures contamination-free welding of zirconium alloy coolant channels. In hydrogen fuel cell production, its gas shielding prevents embrittlement during platinum-coated bipolar plate joining.

Automation & AI Integration—Paired with robotic welding arms, the chamber (2000) could autonomously adjust argon flow via IoT-enabled sensors (1230). Machine learning algorithms might optimize gas pressure (0.5-1.5 psi) in real-time, reducing waste by 40-60% compared to manual systems.

Future Advancements—Potential integrations include AI-driven gas mixing (e.g., Ar/He blends), self-purging vacuum systems (1230), and augmented reality overlays via the viewing window (1310). These innovations would expand the chamber's utility in high-precision fields like quantum computing component assembly or nanomaterial synthesis. By transcending its original design scope, the purge chamber (2000) demonstrates unparalleled versatility in industries demanding contamination-free environments, positioning it as a foundational tool for next-generation manufacturing and research.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A modular purge chamber assembly for welding reactive metals, comprising:
   two split concentric reducers (1000) that are each fabricated from heat-resistant polymer, including a receptacle (1101) and hood (1102);
   a recessed latch system (1110) positioned on opposing sides of at least one of the two reducers (1000) to compress a silicone gasket (1120) against a workpiece (3000);
   a gas distribution network (1200) integrated into the hood (1102), of said at least one of the two reducers (1000) where the gas distribution network comprises at least one hose (1210) connected to a manifold (1220) and layered diffusers (1130, 1140, 1150) disposed within the hood (1102) of said at least one of the two reducers (1000);
   Wherein the two reducers (1000) are positioned with the hoods (1002) facing each other such that an access gap exists between the hoods (1102) the two assemblies (1000), permitting welding torch access to a weld joint (3100) on the workpiece disposed within the hoods (1002);
   wherein the layered diffusers (1130, 1140, 1150) comprise stainless steel wool (1130), 200-mesh woven screens (1140), and perforated sheets (1150) with 2 mm apertures;
   wherein the concentric reducers (1000) include a beveled guide rim (1103) along a rim the hood (1102) of said at least one of the two reducers (1000) to align the welding torch when it set against said rim (1103);
   wherein the concentric reducers (1000) include a beveled guide rim (1103) along a rim the hood (1102) of said at least one of the two reducers (1000) to align the welding torch when it set against said rim (1103); and,
   wherein a thermal tape (1300) is provided around said gap and where said thermal tape (1300) includes a viewing window (1310).

2. The assembly of claim 1 further comprising quick-connect adapters (1230) on the hood (1102) for coupling the hose (1210) to the hood (1102).

3. The assembly of claim 1, wherein quick connect adapters (1230) are positioned to enable gravity-assisted gas venting in vertical orientations.

4. The assembly of claim 1, wherein the silicone gasket (1120) is thermally stable up to 500° C. and includes embedded fiberglass reinforcement.

* * * * *